United States Patent
Kawamura

(10) Patent No.: US 7,286,797 B2
(45) Date of Patent: Oct. 23, 2007

(54) DATA TRANSMISSION SYSTEM, DATA TRANSMISSION METHOD, AND ELECTRONIC APPARATUS

(75) Inventor: Harumi Kawamura, Tokyo (JP)

(73) Assignee: Sony Corporation, Tokyo (JP)

(*) Notice: Subject to any disclaimer, the term of this patent is extended or adjusted under 35 U.S.C. 154(b) by 713 days.

(21) Appl. No.: 10/204,954

(22) PCT Filed: Dec. 25, 2001

(86) PCT No.: PCT/JP01/11387

§ 371 (c)(1), (2), (4) Date: Jan. 2, 2003

(87) PCT Pub. No.: WO02/054404

PCT Pub. Date: Jul. 11, 2002

(65) Prior Publication Data

US 2003/0149810 A1    Aug. 7, 2003

(30) Foreign Application Priority Data

Dec. 28, 2000    (JP)    ............................. 2000-403470

(51) Int. Cl.
H04B 7/00    (2006.01)
(52) U.S. Cl. .................. 455/41.2; 455/3.05; 455/3.06; 455/90.3; 710/5; 710/62
(58) Field of Classification Search ............... 455/41.2, 455/3.05, 3.06, 151.2, 73, 88, 90.3, 67.12, 455/15, 466, 702, 77, 78, 522; 381/311, 381/315, 1, 74; 370/349, 438, 401, 395.2; 709/231; 710/5, 16, 62
See application file for complete search history.

(56) References Cited

U.S. PATENT DOCUMENTS 4,523,191 A * 6/1985 Cretin et al. ........... 340/825.52

6,684,106 B2 * 1/2004 Herbst ........................ 607/66
6,694,381 B1 * 2/2004 Lo et al. ....................... 710/5

(Continued)

FOREIGN PATENT DOCUMENTS

EP    1 058 422 A1    12/2000

(Continued)

OTHER PUBLICATIONS

HAVI: "The HAVi Specification 1.0" (Document No.. XP-002371881), Published Jan. 18, 2000.

(Continued)

Primary Examiner—Nay Maung
Assistant Examiner—Dominic E. Rego
(74) Attorney, Agent, or Firm—Finnegan, Henderson, Farabow, Garrett & Dunner, L.L.P.

(57) ABSTRACT

A data transmission system, a data transmission method and an electronic equipment. In the playback system, by a controller, at step S1, SEID with respect to receiving stream is grasped. At step S2, inquiry command is used to designate SEID to inquire corresponding Bluetooth output plug No. At step S3, the grasped Bluetooth output plug No. is designated to inquire connecting destination within target of this Bluetooth output plug. Further, in the playback system, by the controller, at step S4, operating state of subunit serving as signal source is inquired. At step S5, information indicating signal source of stream is displayed on a display unit.

19 Claims, 34 Drawing Sheets

U.S. PATENT DOCUMENTS

| | | | |
|---|---|---|---|
| 6,769,028 B1* | 7/2004 | Sass et al. | 709/231 |
| 6,937,571 B1* | 8/2005 | Acharya et al. | 370/246 |
| 7,076,561 B1* | 7/2006 | Rosenberg et al. | 709/231 |
| 2002/0197955 A1* | 12/2002 | Witkowski et al. | 455/41 |
| 2005/0235328 A1* | 10/2005 | Horiguchi | 725/80 |

FOREIGN PATENT DOCUMENTS

| | | |
|---|---|---|
| EP | 1 061 490 A2 | 12/2000 |
| JP | 6-52664 | 2/1994 |
| JP | 2001-186149 | 7/2001 |
| JP | 2001-186162 | 7/2001 |
| WO | WO99/23856 | 5/1999 |
| WO | WO99/35856 | 7/1999 |
| WO | WO 00/70824 | 11/2000 |

OTHER PUBLICATIONS

Nusser, René et al., "Bluetooth-based Wireless Connectivity in an Automotive Environment," *Vehicular Technology Conference*, pp. 1935-1942 (2000).

European International Search Report dated Mar. 28, 2006.

* cited by examiner

| cts | ctype | subunit _type | subunit _ID | opcode | Operand[0] |
|---|---|---|---|---|---|
| Operand[1] | | Operand[2] | | Operand[3] | Operand[4] |
| .... | | | | | |
| Operand[n] | | zero | | | |

FIG.4

| cts | response | subunit _type | subunit _ID | opcode | Operand[0] |
|---|---|---|---|---|---|
| Operand[1] | | Operand[2] | | Operand[3] | Operand[4] |
| .... | | | | | |
| Operand[n] | | zero | | | |

FIG.5

| cts : AV/C | ctype : status | Subunit_type, Subunit_ID : unit | Opcode : Set up Network Input plug | Operand[0] : input_plug |
|---|---|---|---|---|
| Operand[1] : network_type | | Operand[2] : length | Operand[3] : Network_type_dependent | Operand[4] : |
| | | | ......... | |
| Operand[n] : | | | zero | |

FIG.11

| cts : AV/C | response : stable | Subunit_type, Subunit_ID : unit | Opcode : Set up Network Input plug | Operand[0] : input_plug |
|---|---|---|---|---|
| Operand[1] : network_type | | Operand[2] : length | Operand[3] : Network_type_dependent | Operand[4] : |
| | | ......... | | |
| Operand[n] : | | zero | | |

FIG.12

| cts : AV/C | ctype : status | Subunit_type, Subunit_ID : unit | Opcode : Set up Network Output plug | Operand[0] : output_plug |
|---|---|---|---|---|
| Operand[1] : network_type | | Operand[2] : length | Operand[3] : Network_type_dependent | Operand[4] : |
| | | | ......... | |
| Operand[n] : | | zero | | |

FIG.13

| cts : AV/C | response : stable | Subunit_type, Subunit_ID : unit | Opcode : Set up Network Output plug | Operand[0] : output plug |
|---|---|---|---|---|
| Operand[1] : network_type | | Operand[2] : length | Operand[3] : Network_type_dependent | Operand[4] : |
| ......... | | | | |
| Operand[n] : | | zero | | |

FIG. 14

| cts:<br>AV/C | ctype:<br>status | Subunit_type, Subunit_ID:<br>unit | Opcode:<br>Set up Network Output plug | Operand[0]:<br>FF |
|---|---|---|---|---|
| Operand[1]:<br>Bluetooth($10_{16}$) | Operand[2]:<br>length($01_{16}$) | | Operand[3]:<br>SEID($12_{16}$) | Operand[4]: |
| | | ⋯⋯⋯⋯ | | |
| Operand[n]: | | zero | | |

FIG.15

| cts: AV/C | response: stable | Subunit_type, Subunit_ID: unit | Opcode: Set up Net work Out put plug | Operand[0]: General bus Out put Plug#1($C1_{16}$) |
|---|---|---|---|---|
| Operand[1]: Bluetooth ($01_{16}$) | | Operand[2]: length($01_{16}$) | Operand[3]: SEID($12_{16}$) | Operand[4]: |
| | | ......... | | |
| Operand[n]: | | | zero | |

FIG.16

| cts :<br>AV/C | ctype :<br>status | Subunit_type, Subunit_ID :<br>unit | Opcode :<br>Set up Network Output plug | Operand[0] :<br>General bus Output<br>Plug#1($C1_{16}$) |
|---|---|---|---|---|
| Operand[1] :<br>FF | | Operand[2] :<br>FF | Operand[3] : | Operand[4] : |
| | | ........ | | |
| Operand[n] : | | zero | | |

FIG.17

| cts : AV/C | response : stable | Subunit_type, Subunit_ID : unit | Opcode : Set up Network Out put plug | Operand[0] : General bus Out put Plug#1(C1$_{16}$) |
|---|---|---|---|---|
| Operand[1] : Bluetooth (01$_{16}$) | Operand[2] : length(01$_{16}$) | | Operand[3] : SEID(12$_{16}$) | Operand[4] : |
| | | ⋯⋯⋯⋯ | | |
| Operand[n] : | zero | | | |

FIG.18

| cts : AV/C | ctype : status | Subunit_type, Subunit_ID : unit | Opcode : General Bus Set up | Operand[0] : Bus_type |
|---|---|---|---|---|
| | | ..... | ..... | ..... |
| Operand[1] : Bus_type_dependent | | | | |
| ............ | | | | |
| Operand[n] : | | zero | | |

FIG.19

| cts : AV/C | response : stable | Subunit_type, Subunit_ID : unit | Opcode : General Bus Set up | Operand[0] : Bus_type |
|---|---|---|---|---|
| | | ..... | ..... | ..... |
| Operand[1] : Bus_type_dependent | | ............ | | |
| Operand[n] : | | zero | | |

FIG.20

| cts:<br>AV/C | ctype:<br>status | Subunit_type, Subunit_ID:<br>unit | Opcode:<br>General Bus Set up | Operand[0]:<br>Bluetooth(40h) |
|---|---|---|---|---|
| Operand[1]:<br>Out put | Operand[2]:<br>$FF_{16}$ | Operand[3]:<br>$SEID(12_{16})$ | zero | |

FIG.21

| cts : AV/C | response : stable | Subunit_type, Subunit_ID : unit | Opcode : General Bus Set up | Operand[0] : Bluetooth(40h) |
|---|---|---|---|---|
| Operand[1] : Out put | | Operand[2] : General Bus Plug#1(C1₁₆) | Operand[1] : SEID(12₁₆) | zero |

FIG.22

| cts : AV/C | ctype : status | Subunit_type, Subunit_ID : unit | Opcode : General Bus Set up | Operand[0] : Bluetooth(40h) |
|---|---|---|---|---|
| Operand[1] : Out put | | Operand[2] : General Bus Plug#1(C1₁₆) | Operand[1] : FF₁₆ | zero |

FIG.23

| cts :<br>Extended AV/C | ctype :<br>status | Subunit_type_Subunit_ID :<br>unit | Opcode :<br>Bluetooth Plug Mapping | Operand[0] ~<br>Operand[n] |
|---|---|---|---|---|
| | | FF | | SEID |

FIG.26

|  | Length | ck | msb | | | | | | lsb |
|---|---|---|---|---|---|---|---|---|---|
| opcode | 1 | ✓ | colspan="7" | CONNECT ($24_{16}$) |
| operand [0] | 1 | ✓ | colspan="5" | $3F_{16}$ | lock | perm |
| operand [1] | 1 | ✓ | colspan="5" | source_subunit_type | colspan="2" | source_subunit_ID |
| ⋮ | 1 | ✓ | colspan="7" | source_plug |
| ⋮ | 1 | ✓ | colspan="5" | destination_subunit_type | colspan="2" | destination_subunit_ID |
| operand [n] | 1 | ✓ | colspan="7" | destination_plug |

FIG.29

| cts : Extended AV/C | ctype : status | Subunit_type, Subunit_ID : unit | Opcode : Bluetooth Possible Connections | Operand[0]~Operand[n] : FF |

FIG.31

| cts :<br>Extended AV/C | ctype :<br>status | Subunit_type, Subunit_ID :<br>unit | Opcode :<br>Make Bluetooth Connection | Operand[0]~Operand[n] :<br>Bluetooth Device ID |
|---|---|---|---|---|

FIG.33

DATA TRANSMISSION SYSTEM, DATA TRANSMISSION METHOD, AND ELECTRONIC APPARATUS

TECHNICAL FIELD

This invention relates to a data transmission system and a data transmission method for transmitting and receiving stream by plural electronic equipments, and an electronic equipment constituting a data transmission system for transmitting and receiving stream by plural electronic equipments.

BACKGROUND ART

In recent years, there has been proposed a system in which AV (Audio Video) equipments such as CD (Compact Disc) player or digital video, etc. is connected through network to transmit or receive audio stream or video stream. As network for realizing such a system, there is, e.g., network in which AV equipments are connected by serial bus in conformity with the IEEE 1394 where various standards are drafted with IEEE Std. 1394-1995: IEEE Standard for a High Performance serial Bus recognized by IEEE (Institute of Electrical and Electronics Engineers) being as the fundamental specification.

In the IEEE 1394, AV/C (Audio Video/Control) command is employed as command set in protocol in which content relating to control of AV equipment is defined. In addition, in the IEEE 1394, setup in transmission of AV signal and transmission packet format are prescribed in IEC (International Electrotecchnical Commission) 61883, and management of logical connection and disconnection between equipments is carried out in conformity with connection management in accordance with this IEC 61883.

In such IEEE 1394, with respect to flow of stream within the equipment, Plug Control Register (hereinafter abbreviated as PCR) defined in the IEC 61883 is used to carry out management of logical input/output port for carrying out input/output of data. On the other hand, in the IEEE 1394, with respect to flow of stream between different equipments, AV/C serial bus plug defined in the AV/C command is used to carry out management of logical input/output port for carrying out input/output of data. Further, in the IEEE 1394, these PCR and AV/C serial bus plug are caused to have one-to-one correspondence. For this reason, in the IEEE 1394, connection is established, e.g., between plug of subunit serving as source of data and plug of unit so as to have one-to-one correspondence, and correspondence between flow of stream within the equipment and flow of stream between equipments becomes clear. Accordingly, control of the entirety of the system is facilitated.

Meanwhile, in recent years, as one technology of short range wireless communication standard which has been developed in order to mutually carry out wireless connection of portable terminal machine and peripheral equipment thereof, attention is drawn to Bluetooth™ Wireless Technology. Further, in recent years, there has been tried a method in which Bluetooth Wireless Technology is applied to AV equipment to carry out wireless communication of audio stream or video stream.

In such Bluetooth specification, two protocols, i.e., protocol called AVCTP (AV Control Transport Protocol) and protocol called AVDTP (AV Distribution Transport Protocol) are prescribed The AVCTP is protocol in the Bluetooth in which content relating to control of AV equipment is defined, and the above-described AV/C command is employed similarly to the IEEE 1394 as command set in the AVCTP. On the other hand, the AVDTP is protocol in the Bluetooth specification in which content relating to transmission of AV signal is defined, and is protocol corresponding to connection management in accordance with the above-described IEC 61883.

These AVCTP and AVDTP are protocols independent each other. For this reason, in the Bluetooth application, in such cases that, e.g., transmission of AV signal is not carried out, but operation control of AV equipment is carried out merely by remote control, if only AVCTP is used, it is possible to control the AV equipment. On the other hand, in such cases that the AV equipment is not controlled, but transmission of AV signal is merely carried out, if only AVDTP is used, it is possible to carry out transmission of AV signal.

However, in the Bluetooth specification, there is no relevance between interface with respect to stream within the equipment which is defined at the side of AVCTP and interface with respect to stream between equipments which is defined at the side of AVDTP.

For this reason, in the Bluetooth application, even if, e.g., audio stream or video stream can be received, equipment of that receiving side could not recognize signal source of stream. In more practical sense, in the case where equipment of the transmitting side of stream employs plural subunits as signal source, when, e.g., equipment of the transmitting side has two signal sources of player and tuner, the equipment of the receiving side could receive stream from these respective signal sources, but could not recognize that received stream is outputted from any signal source. Accordingly, the equipment of the receiving side could not notify information of signal source to user by display, etc. As described above, the system to which Bluetooth specification is applied could not carry out control of the entirety of this system. As a result, convenience was injured for user.

In addition, in the Bluetooth specification, procedure when connection is given is prescribed between equipment of the transmitting side and equipment of the receiving side by AVDTP. Accordingly, in the Bluetooth specification, while control could be carried out in connection with mutual connection by these two equipments, it was impossible that the third equipment except for the two equipments is caused to be controller to control connection between these two equipments.

DISCLOSURE OF THE INVENTION

This invention has been made in view of such circumstances, and its object is to provide a data transmission system, a data transmission method and an electronic equipment in which interface with respect to stream within the equipment and interface with respect to stream between equipments are caused to be related to each other so that control of stream can be carried out. In addition, another object of this invention is to provide a data transmission system and a data transmission method which can control connection between two equipments by equipment except for the two equipments which carry out transmission/reception of data, and an electronic equipment capable of controlling connection between two equipments which carry out transmission/reception of data.

A data transmission system according to this invention which attains the above-described objects is directed to a data transmission system for carrying out transmission/reception of stream by wireless-connected plural electronic equipments, wherein a first electronic equipment which transmits stream comprises one or plural signal generating means serving as signal source of stream, and a second electronic equipment which receives stream grasps either one of identifier for identifying interface with respect to stream within the first electronic equipment outputted from the one or plural signal generating means and identifier for identifying interface with respect to stream between the second electronic equipment and the first electronic equipment, and comprises command generating means for generating command for making an inquiry with respect to the first electronic equipment about mapping of the one identifier which has been grasped and the other identifier which has not been grasped on the basis of the one identifier which has been grasped, and response analysing means for analysing response indicating information of the other identifier transmitted from the first electronic equipment.

Such data transmission system according to this invention makes an inquiry with respect to the first electronic equipment about mapping of the one identifier which has been grasped and the other identifier which has not been grasped on the basis of the one identifier which has been grasped by the second electronic equipment to carry out correlating between one identifier and the other identifier.

Moreover, a data transmission method according to this invention which attains the above-described objects is directed to a data transmission method of carrying out transmission/reception of stream by wireless-connected plural electronic equipments, wherein a second electronic equipment which receives the stream grasps either one of identifier for identifying interface with respect to stream within a first electronic equipment which transmits the stream outputted from one or plural signal generating means serving as signal source of stream that the first electronic equipment has and identifier for identifying interface with respect to the stream between the first electronic equipment and the second electronic equipment, the data transmission method comprising: a command generation step of generating command which makes an inquiry with respect to the first electronic equipment about mapping of the one identifier which has been grasped and the other identifier which has not been grasped on the basis of the one identifier that the second electronic equipment has grasped by the second electronic equipment, and a response analysis step of analysing response indicating information of the other identifier transmitted from the first electronic equipment by the second electronic equipment.

Such data transmission method according to this invention makes an inquiry with respect to the first electronic equipment about mapping of one identifier which has been grasped and the other identifier which has not been grasped on the basis of the one identifier which has been grasped by the second electronic equipment to carry out correlating between one identifier and the other identifier.

Further, an electronic equipment according to this invention which attains the above-described objects is directed to an electronic equipment which is wireless-connected to other electronic equipment and is capable of receiving stream transmitted from the other electronic equipment, wherein the electronic equipment grasps either one of identifier for identifying interface with respect to stream within the other electronic equipment outputted from one or plural signal generating means serving as signal source of stream that the other electronic equipment has and identifier for identifying interface with respect to stream between the electronic equipment and the other electronic equipment, and comprises command generating means for generating command which makes an inquiry with respect to the other electronic equipment about mapping of the one identifier which has been grasped and the other identifier which has not been grasped on the basis of the one identifier which has been grasped, and response analysing means for analysing response indicating information of the other identifier transmitted from the other electronic equipment.

Such electronic equipment according to this invention makes an inquiry with respect to the other electronic equipment about mapping of one identifier which has been grasped and the other identifier which has not been grasped on the basis of the one identifier which has been grasped to carry out correlating between one identifier and the other identifier.

Furthermore, a data transmission system according to this invention which attains the above-described objects is directed to a data transmission system for carrying out transmission/reception of stream by plural electronic equipments, the data transmission system comprising a first electronic equipment for transmitting or receiving the stream, a second electronic equipment which is wireless-connected to the first electronic equipment and is capable of receiving or transmitting the stream, and a third electronic equipment for generating command which selects the second electronic equipment in accordance with the first electronic equipment to instruct the first electronic equipment to connect to the second electronic equipment.

Such data transmission system according to this invention allows the third electronic equipment to select the second electronic equipment in accordance with the first electronic equipment to instruct the first electronic equipment to connect to the second electronic equipment.

Further, a data transmission method according to this invention which attains the above-described objects is directed to a data transmission method of carrying out transmission/reception of stream by plural electronic equipments, the data transmission method comprising a command generation step of generating command which selects, by a third electronic equipment, a second electronic equipment which is wireless-connected to a first electronic equipment which transmits or receives the stream and is capable of receiving or transmitting the stream in accordance with the first electronic equipment to instruct the first electronic equipment to connect to the second electronic equipment by the third electronic equipment.

Such data transmission method according to this invention allows the third electronic equipment to select the second electronic equipment in accordance with the first electronic equipment to instruct the first electronic equipment to connect to the second electronic equipment.

Further, an electronic equipment according to this invention which attains the above-described objects is directed to an electronic equipment constituting a data transmission system adapted for carrying out transmission/reception of stream by plural electronic equipments, the electronic equipment comprising command generating means for generating command which selects, in accordance with a first electronic equipment for transmitting or receiving the stream, a second electronic equipment which is wireless-connected to the first electronic equipment and is capable of receiving or transmitting the stream to instruct the first electronic equipment to connect to the second electronic equipment.

Such electronic equipment according to this invention selects the second electronic equipment in accordance with the first electronic equipment to instruct the first electronic equipment to connect to the second electronic equipment.

Furthermore, a data transmission system according to this invention which attains the above-described objects is directed to a data transmission system for carrying out transmission/reception of stream by plural electronic equipments, the data transmission system comprising a first electronic equipment for transmitting or receiving the stream, a second electronic equipment which is wireless-connected to the first electronic equipment and is capable of receiving or transmitting the stream, and a third electronic equipment for generating command to discover an electronic equipment or equipments in which connection can be made with respect to the first electronic equipment.

Such data transmission system according to this invention gives, by the third electronic equipment, an instruction so as to discover an electronic equipment or equipments in which connection can be made with respect to the first electronic equipment.

Further, a data transmission method according to this invention which attains the above-described objects is directed to a data transmission method of carrying out transmission/reception of stream by plural electronic equipments, the data transmission method comprising a command generation step of generating command to discover an electronic equipment or equipments in which connection can be made with respect to a first electronic equipment for transmitting or receiving the stream by a third equipment which is different from the first electronic equipment and a second electronic equipment which is wireless-connected to the first electronic equipment and is capable of receiving or transmitting the stream.

Such data transmission method according to this invention gives, by the third electronic equipment, an instruction so as to discover an electronic equipment or equipments in which connection can be made with respect to the first electronic equipment.

In addition, an electronic equipment according to this invention which attains the above-described objects is directed to an electronic equipment constituting a data transmission system for carrying out transmission/reception of stream by plural electronic equipments, wherein the electronic equipment is different from a first electronic equipment for transmitting or receiving stream and a second electronic equipment which is wireless-connected to the first electronic equipment and is capable of receiving or transmitting the stream, the electronic equipment comprising command generating means for generating command to discover an electronic equipment or equipments in which connection can be made with respect to the first electronic equipment.

Such electronic equipment according to this invention give an instruction so as to discover an electronic equipment or equipments in which connection can be made with respect to the first electronic equipment.

Still further objects of this invention and more practical merits obtained by this invention will become more apparent from the description of the embodiments which will be given.

BRIEF DESCRIPTION OF THE DRAWINGS

FIG. 4 is a view for explaining the configuration of command frame caused to be in capsule form with respect to FCP frame in the asynchronous packet shown in FIG. 3.

FIG. 5 is a view for explaining the configuration of response frame caused to be in capsule form with respect to FCP frame in the asynchronous packet shown in FIG. 3.

FIG. 11 is a view for explaining the configuration of command frame of inquiry command by the first definition for inquiring mapping of SEID and Bluetooth-output plug No., and is a view for explaining the configuration of command frame of inquiry command for inquiring information relating to input plug.

FIG. 12 is a view for explaining the configuration of response frame with respect to the inquiry command shown in FIG. 11.

FIG. 13 is a view for explaining the configuration of command frame of inquiry command by the first definition for inquiring mapping of SEID and Bluetooth output plug No., and is a view for explaining the configuration of command frame of inquiry command for inquiring information relating to output plug.

FIG. 14 is a view for explaining the configuration of response frame with respect to the inquiry command shown in FIG. 13.

FIG. 15 is a view for explaining the configuration of command frame of inquiry command in the case where Bluetooth-output plug No. corresponding to SEID is inquired.

FIG. 16 is a view for explaining the configuration of response frame with respect to the inquiry command shown in FIG. 15.

FIG. 17 is a view for explaining the configuration of command frame of inquiry command in the case where information for identifying interface with respect to stream between equipments corresponding to general bus output plug No. is inquired.

FIG. 18 is a view for explaining the configuration of response frame with respect to the inquiry command shown in FIG. 17.

FIG. 19 is a view for explaining the configuration of command frame of inquiry command by the second definition for inquiring mapping of SEID and Bluetooth output plug No., and is a view for explaining the configuration of command frame of inquiry command for inquiring information relating to input plug.

FIG. 20 is a view for explaining the configuration of response frame with respect to the inquiry command shown in FIG. 19.

FIG. 21 is a view for explaining the configuration of command frame of inquiry command by the second definition for inquiring mapping of SEID and Bluetooth output plug No., and is a view for explaining the configuration of command frame of inquiry command for inquiring information relating to output plug.

FIG. 22 is a view for explaining the configuration of response frame with respect to the inquiry command shown in FIG. 21.

FIG. 23 is a view for explaining the configuration of command frame of inquiry command in the case where Bluetooth output plug No. corresponding to SEID is inquired.

FIG. 26 is a view for explaining the configuration of command frame of inquiry command by the third definition for inquiring mapping of SEID and Bluetooth output plug No.

FIG. 29 is a view for explaining the configuration of command frame of connect command.

FIG. 31 is a view for explaining the configuration of command frame of command which discovers device in which connection can be made.

FIG. 33 is a view for explaining the configuration of command frame of command which establishes connection between two devices.

BEST MODE FOR CARRYING OUT THE INVENTION

More practical embodiments to which this invention is applied will now be described in detail with reference to the attached drawings.

This embodiment is directed to a data transmission system for carrying out transmission/reception of audio stream and/or video stream by AV (Audio Video) equipment wireless-connected by Bluetooth Wireless Technology. In this data transmission system, correlating between interface with respect to stream within equipment and interface with respect to stream between equipments is carried out, thereby making it possible to carry out control of stream, and making it possible to obtain information of signal source of stream at the receiving side. In addition, in this data transmission system, when transmission/reception of stream on Bluetooth link is carried out between two equipments, equipment except for the two equipments is caused to be controller, thus making it possible to control connection between two equipments by this controller.

First, here, prior to the explanation of more practical data transmission system, protocol prescribed in the Bluetooth specification will be described.

Figure 1:
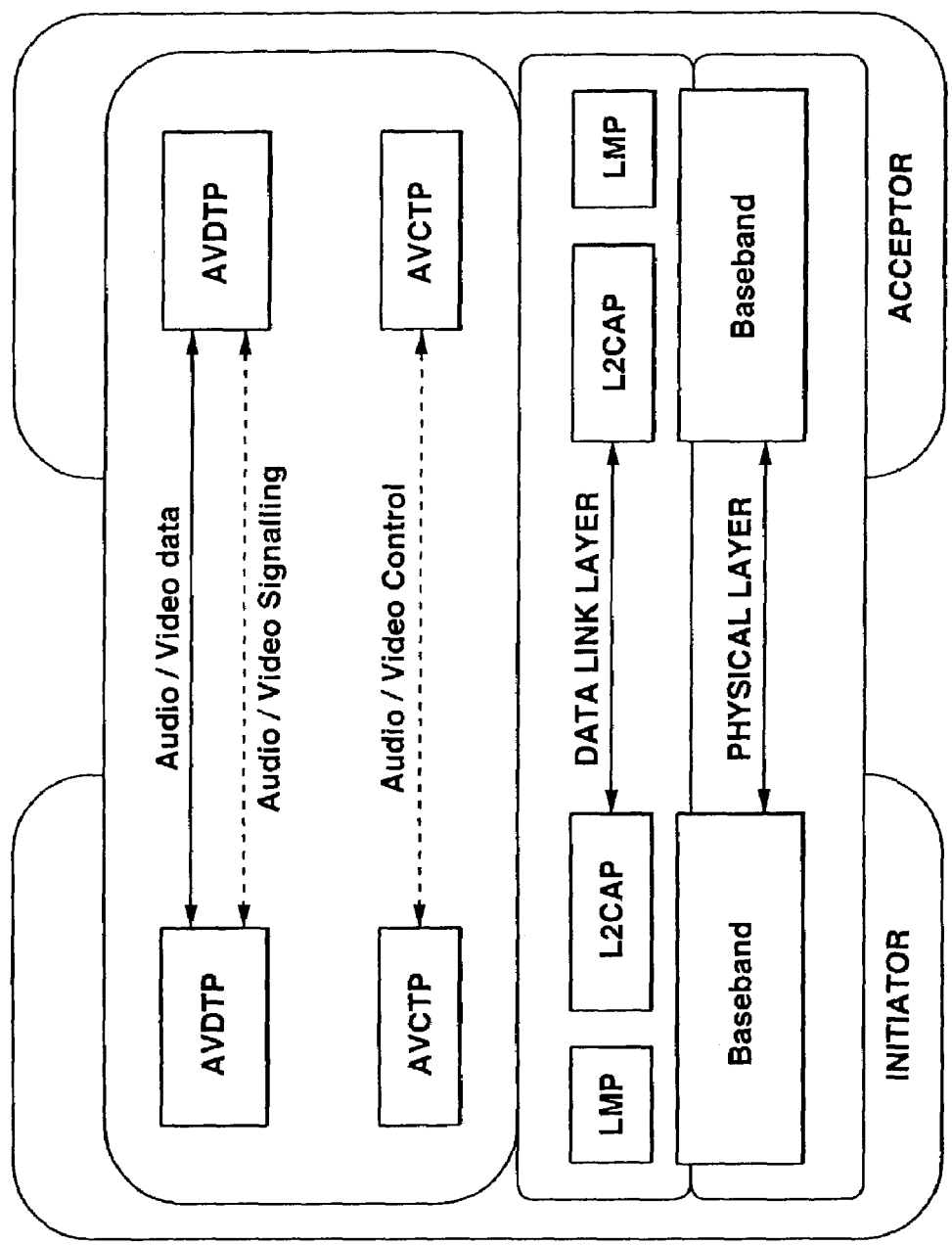
FIG. 1 is a view for explaining architecture of protocol prescribed in Bluetooth specification.

In the Bluetooth specification, as shown in FIG. 1, among two equipments which carry out communication, equipment at the side of carrying out setup of connection is called Initiator and equipment at the side opposite thereto is called Acceptor. As protocol stack in the Bluetooth specification, when roughly classified, there is employed a structure in which protocol called AVCTP (AV Control Transport Protocol) and protocol called AVDTP (AV Distribution Transport Protocol) are provided on Physical layer and Data Link layer, and the Initiator and the Acceptor are mutually connected between respective layers in such protocol caused to be of hierarchical structure. It is to be noted that, in the Bluetooth specification, at the Data Link layer, synchronous communication oriented communication link of the line switching type called SCO (Synchronous Connection Oriented) link and asynchronous communication oriented communication link of the packet switching type called ACL (Asynchronous Connection Less) link are defined. In the Bluetooth specification, in the case where transmission of signal for which real time characteristic is required such as audio stream or video stream, etc. is carried out, SCO link is ordinarily used. However, in this SCO link, in the case where error takes place, it is impossible to carry out re-sending. In view of the above, in the Bluetooth specification, in order to realize real time transmission even if the transmission system is asynchronous communication, such an attempt is made to superimpose so-called RTP which is time stamp used in internet, etc. on ACL link to thereby carry out transmission of audio stream or video stream by using the ACL link.

Here, two protocols, i.e., AVTCP and AVDTP will be described in detail.

The AVCTP is protocol in which content relating to control of AV equipment is defined, and there is employed AV/C (Audio Video/Control) command employed in the 1394 Trade Association in which various standards are drafted with IEEE Std. 1394·1995:IEEE Standard for a High Performance serial Bus recognized by IEEE (Institute of Electrical and Electronics Engineers) as command set in this AVCTP being as the fundamental specification. In the Bluetooth application, e.g., various commands such as Playback command, etc. and responses with respect to respective various commands are exchanged between the Controller and the Target by using this AVCTP.

Figure 2:
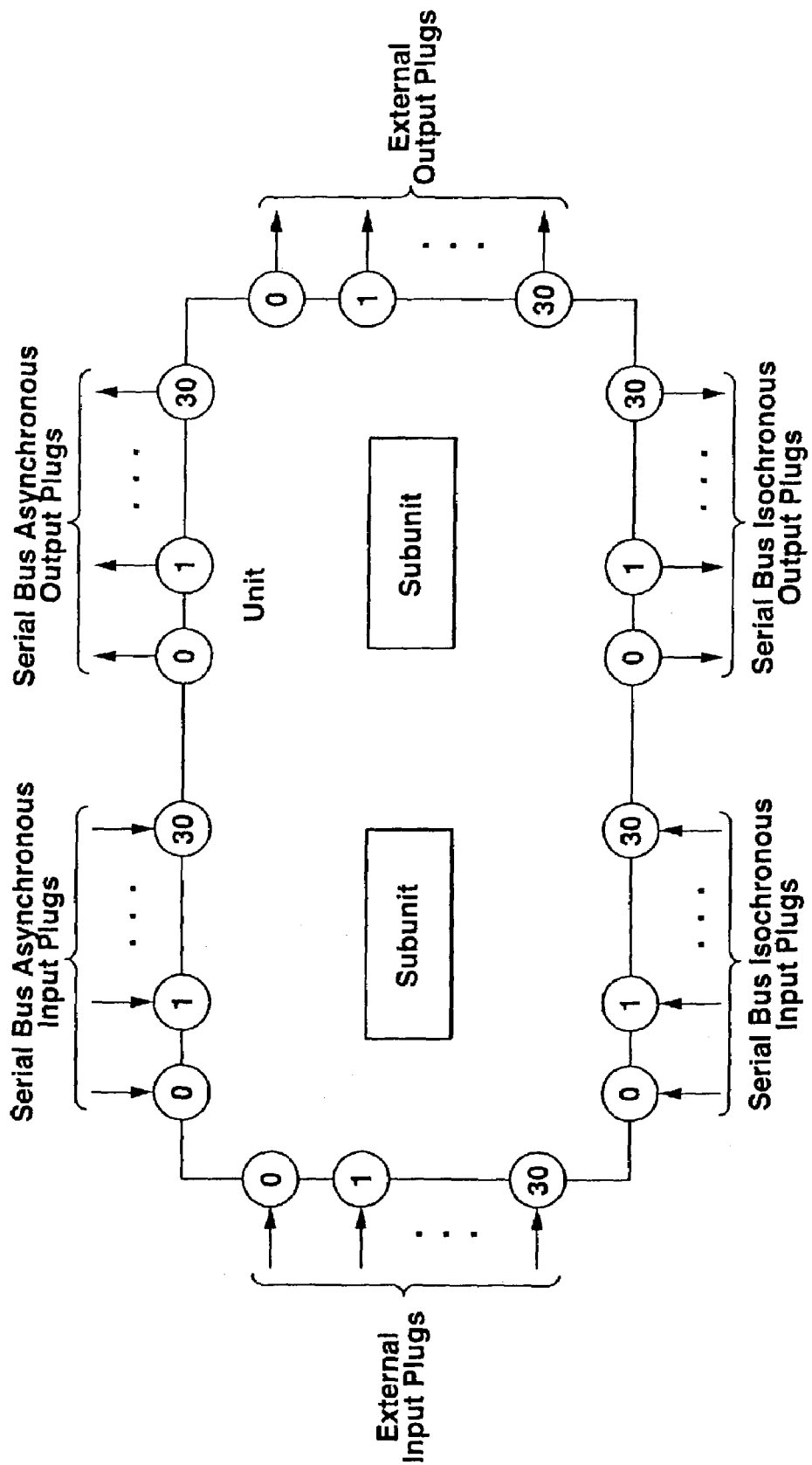
FIG. 2 is a view for explaining AV/C unit model.

Here, in the AV/C, as shown in FIG. 2, set of equipments physically existing is expressed by logic as unit, set existing at the lower rank concept of this unit and for realizing logical function of equipment is expressed as subunit, and unit existing at further lower rank concept with respect to the subunit and for realizing logical function is expressed as function block although not shown as occasion demands. The unit and the subunit are concept in which physical hardware and/or software of equipment are included. Additionally, the function block may be constituted only by software such as program, etc.

Further, in the AV/C, logical input/output port for carrying out input/output of data is expressed as the concept called plug. In the AV/C, as plug used for isochronous transmission which is synchronous communication in the IEEE 1394, 31 Serial Bus Isochronous Input Plugs and 31 Serial Bus Isochronous Output Plugs are prescribed. As plug used for asynchronous transmission which is asynchronous communication in the IEEE 1394, 31 Serial Bus Asynchronous Input Plugs and 31 Serial Bus Asynchronous Output Plugs are prescribed. As plug applied to network except for the IEEE 1394 and used in practice for input/output of analog data, 31 External Input Plugs and 31 External Output Plugs are prescribed. In the AV/C, these unit plugs provided at the unit and subunit plugs (not shown) provided at the subunit are connected fixedly or after undergo switching as occasion demands, whereby transmission path of stream within the equipment is established. It is to be noted that while the example where two subunits are provided is indicated in the figure, the number of subunits may be increased or decreased. In this invention, as described later, there are newly provided components for carrying out transmission of data by general bus including Bluetooth network as plug serving as interface with respect to stream within equipment provided at unit.

Figure 3:
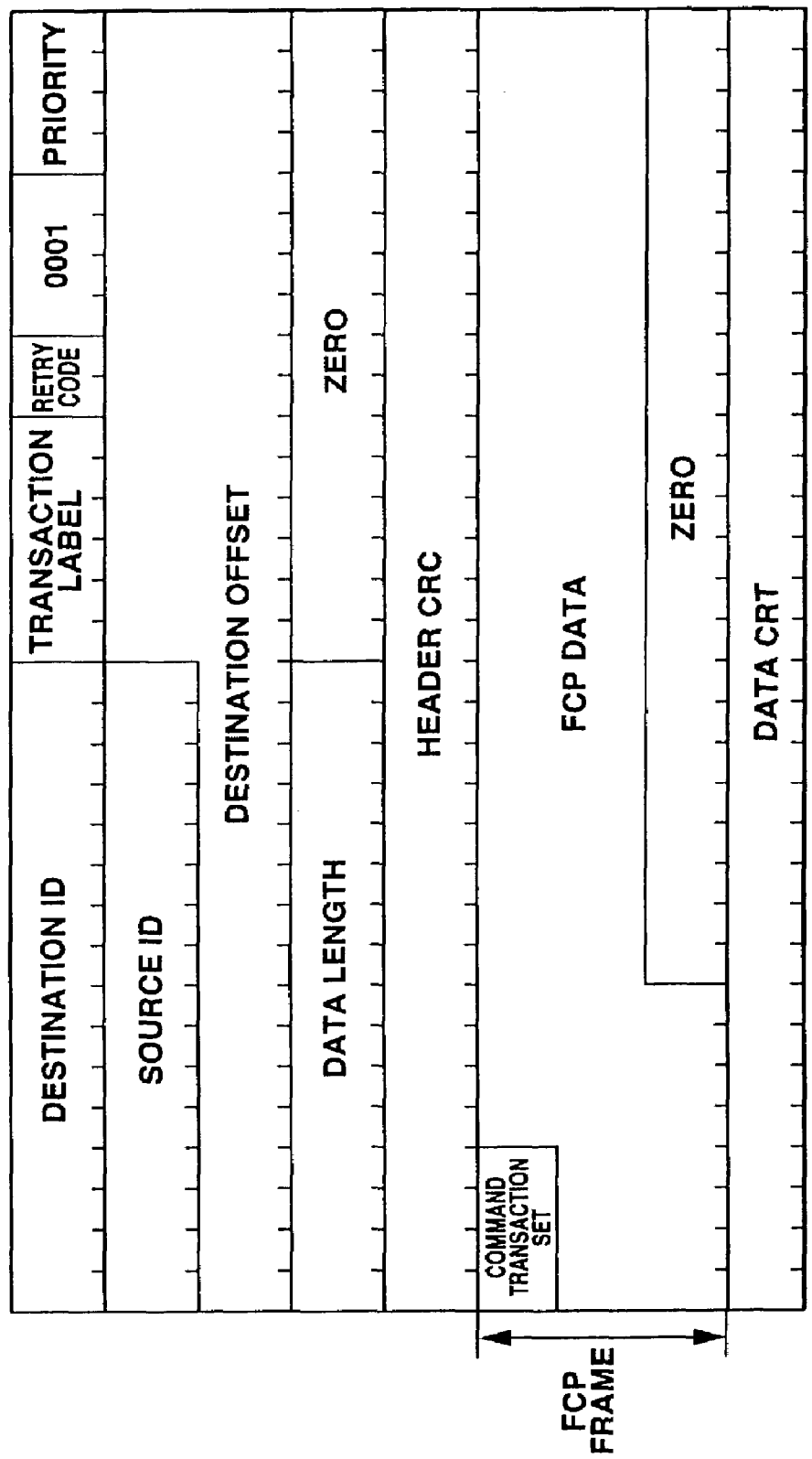
FIG. 3 is a view for explaining the configuration of asynchronous packet in which command caused to undergo transmission/reception in the AV/C is stored.

Further, in the AV/C, command is transmitted from equipment serving as controller to respective equipments by asynchronous packet as shown in FIG. 3. The asynchronous packet has the configuration that, in addition to destination ID field (Destination_ID) indicating address of unit of transmit destination and source ID field (Source_ID) indicating address of unit of transmit source, after packet header consisting of transaction label field (transaction label; tl), retry code field (retry code; rt), transaction code field (transaction code; tcode), priority field (priority; pri), destination offset field (Destination_offset), data length field (Data_length), zero field (zero), and header CRC field (Cyclic Redundancy Check) (Header_CRC), there is continued data block consisting of FCP frame (Function Control Protocol frame) consisting of command transaction set field (Command Transaction Set; cts), FCP data field (Function Control Protocol data) and zero field (zero) as occasion demands, and data CRC field (Data_CRC).

In the FCP frame, command and response are caused to be in capsule form. As shown in FIG. 4, command frame consists of the above-described transaction set field (Command Transaction Set; cts) indicating kind of command set, command type field (Command type; ctype) indicating kind of command, subunit type field (subunit_type) and subunit ID field (subunit_ID) for forming address of subunit of transmit destination, opcode field (opcode), plural operand fields (Operand), and zero field (zero) as occasion demands. On the other band, as shown in FIG. 5, response frame consists of command transaction set field (Command Transaction Set; cts), response code field indicating kind of response (Response code; response), subunit type field (subunit_type) and subunit ID field (subunit_ID) for forming address of subunit of transmit source, opcode field (opcode), plural operand fields (Operand), and zero field (zero) as occasion demands. Additionally, in the case of AV/C, with respect to both command frame and response frame, "0000" is stored as value in the command transaction set field.

In the AV/C, information of equipment serving as target that equipment serving as controller attempts to control, and/or information indicating processing content to be controlled are stored with respect to command frame, and information indicating processing content corresponding to command by equipment serving as target is stored with respect to response frame.

Figure 6:
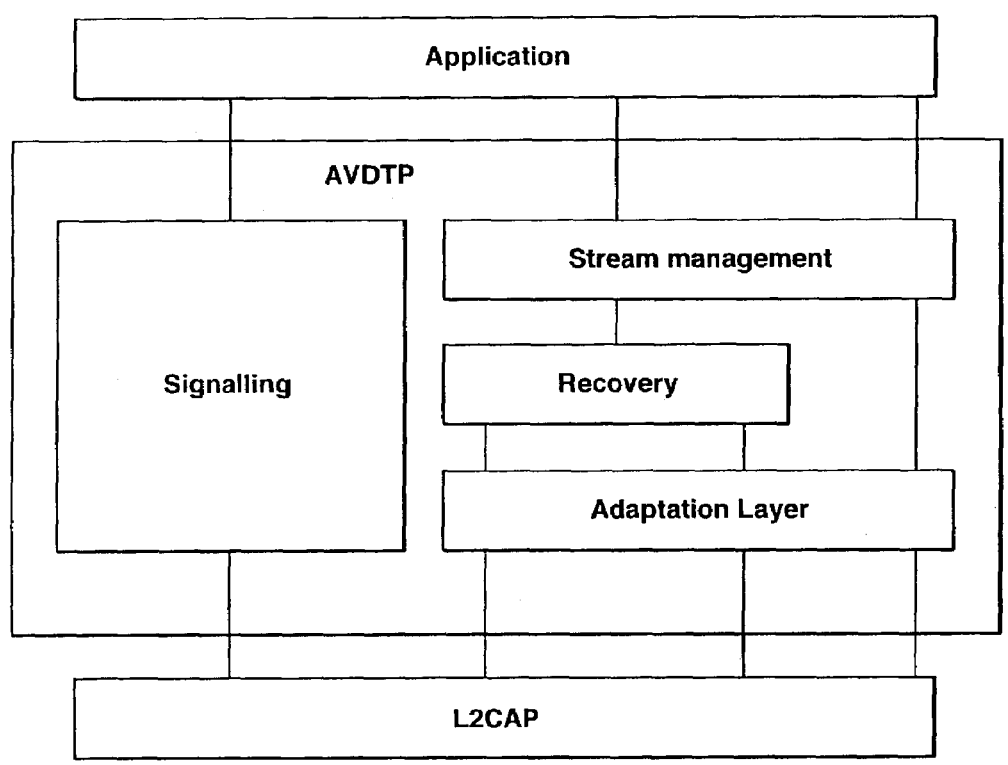
FIG. 6 is a view for explaining architecture of AVDTP.

On the other hand, AVDTP is a protocol in which content relating to transmission of AV signal is defined, and is roughly classified into two systems of signalling and streaming. In more practical sense, as shown in FIG. 6, the AVDTP intermediates between logical link management layer (Logical Link Control and Adaptation Protocol; L2CAP) in the data layer and application layer.

Signalling is carried out at the preceding stage of actual data transmission, and is used, e.g., for discriminating format to which equipment corresponds, or discriminating an equipment which can receive data to be transmitted from the application layer to carry out negotiation to set up connection with respect to the logical link management layer.

On the other hand, Streaming consists of Adaptation Layer, Recovery and Stream management from the logical link management layer side. The adaptation layer serves to include data for error correction or control data, etc. with respect to stream from the application layer so that packet data is provided. Recovery serves to carry out resending in the case where error takes place. Stream management carries out management of the Adaptation Layer and the Recovery.

In the Bluetooth specification, prior to carrying out transmission of data between two equipments which carry out transmission/reception of data by using such AVDTP, transmission path of stream between equipments, i.e., connection is established by Signalling. At this time, interface in the equipment at the side for transmitting data is handled as Stream End Point. Namely, interface in the equipment at the side for transmitting data is handled as termination of individual streams.

Figure 7:
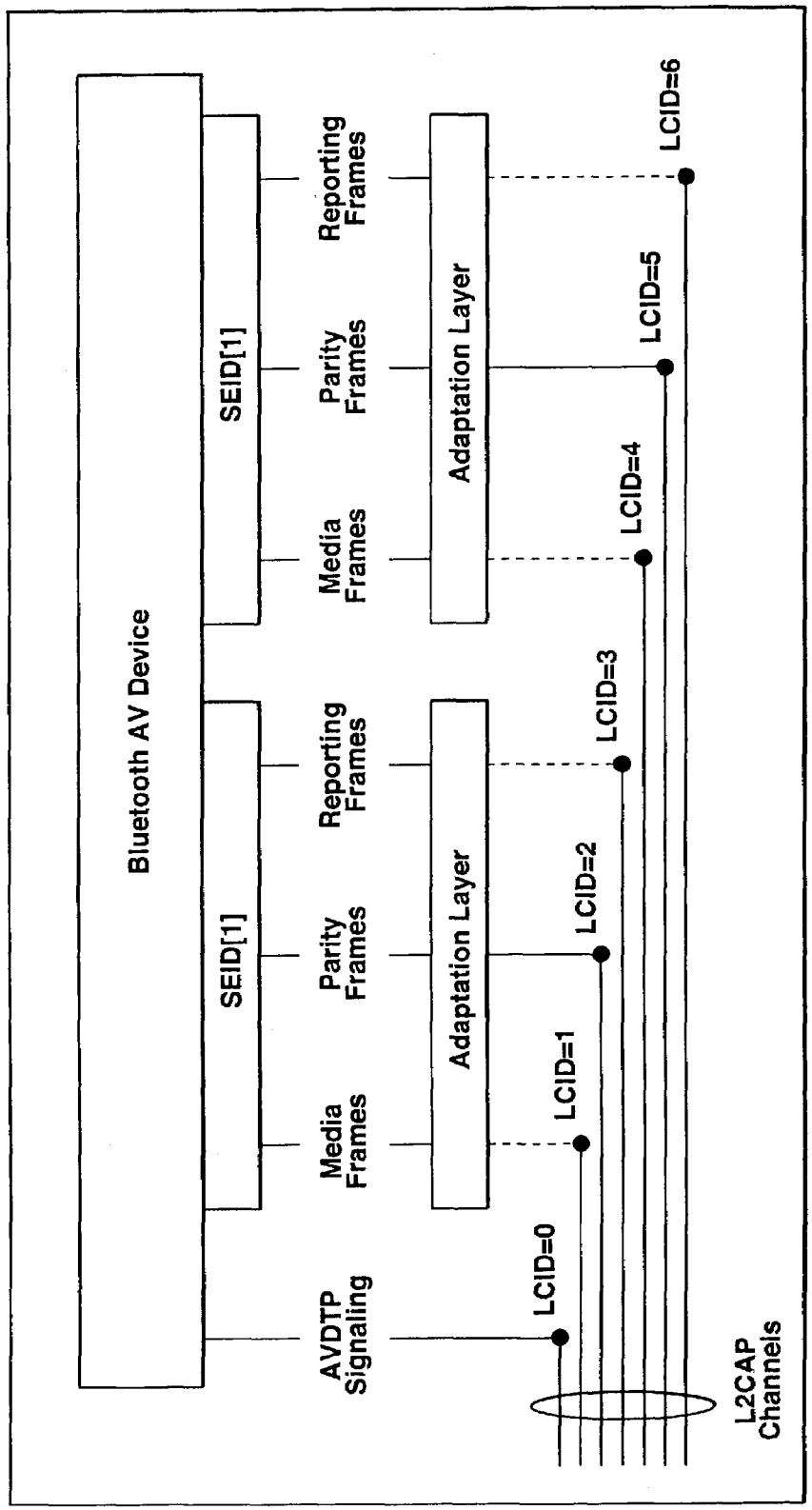
FIG. 7 is a view for explaining the configuration of an example of AV device, and is a view for explaining stream end point.

In more practical sense, in the Bluetooth specification, as the example of AV device is shown in FIG. 7, Bluetooth AV device as the application layer and the logical link management layer channel (L2CAP channels) are connected by signalling. When connection is established by this signalling, interface of the Bluetooth AV device is handled as stream end point. Respective stream end points are caused to undergo management as stream end point ID (Stream End point IDentifier which will be referred to as SEID hereinafter). As described above, plug number is statically assigned in such a manner that plug serving as interface with respect to stream within the equipment is fixedly or suitably switched. On the contrary, in stream end point serving as interface with respect to stream between equipments, SEID is dynamically assigned every time connection is given. It is to be noted that while the example where two SEIDs (SEID [1], SEID [2]) are provided is shown in the figure, the number of SEIDs may be increased or decreased in accordance with the number of subunits serving as signal source.

Media Frames serving as actual audio data or video data, Parity Frames serving as data for error correction and Reporting Frames serving as other control data are outputted from Bluetooth AV device through respective stream end points, and are delivered to the above-described Adaptation Layers provided in correspondence with respective stream end points. In the respective Adaptation Layers, as described above, media frames, parity frames and reporting frames are caused to be in a packet form. The streams caused to be in a packet form are delivered to respective logical link management layer channels, and are outputted to the external through the above-described physical layer. Additionally, command and response are adapted so that links are separately given although not shown, and are caused to undergo transmission/reception through such links.

Now, more practical data transmission system to which Bluetooth specification in which such protocol is prescribed is applied will be described below.

Figure 8:
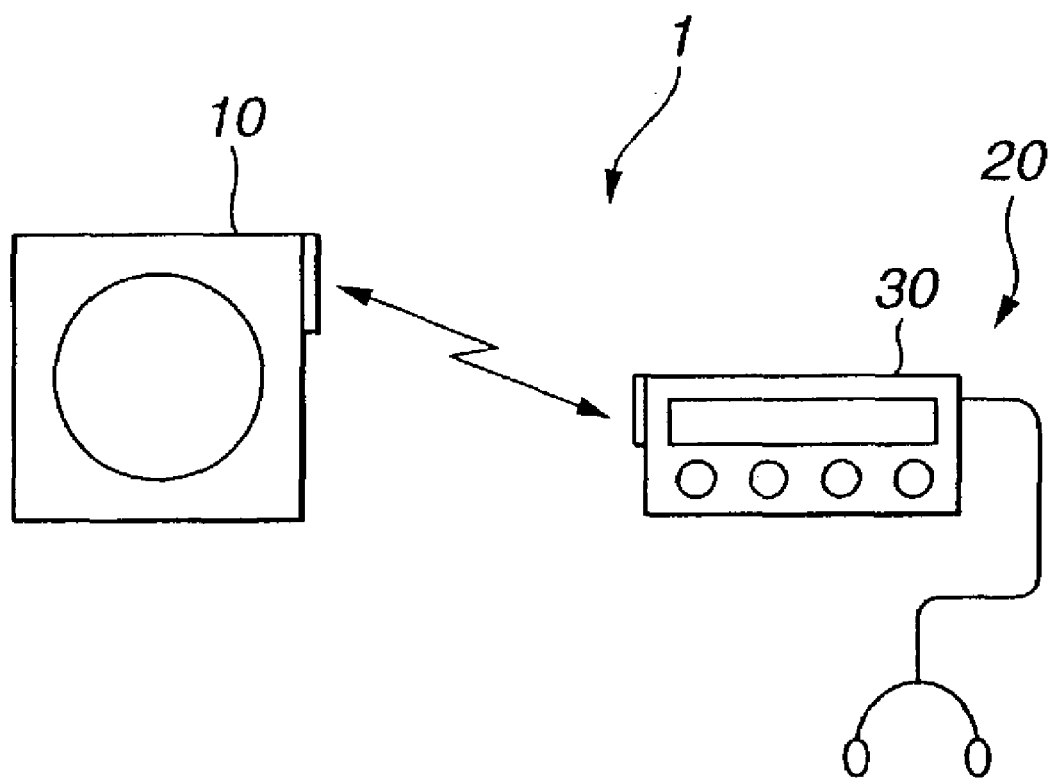
FIG. 8 is a view for explaining the configuration of playback (reproduction) system shown as the embodiment of this invention.

First, as an example of data transmission system for carrying out correlating between interface with respect to stream within the equipment and interface with respect to stream between equipments, a playback (reproduction) system 1 shown in FIG. 8 will be described. In this playback (reproduction) system 1, a player 10 with audio tuner and a headphone 20 that a remote controller 30 for carrying out remote control of this player 10 is attached are connected by Bluetooth link. The player 10 becomes operative in accordance with instruction from the headphone 20. The headphone 20 receives audio stream outputted from the player 10 and outputs such audio stream to the external as voice.

Figure 9:
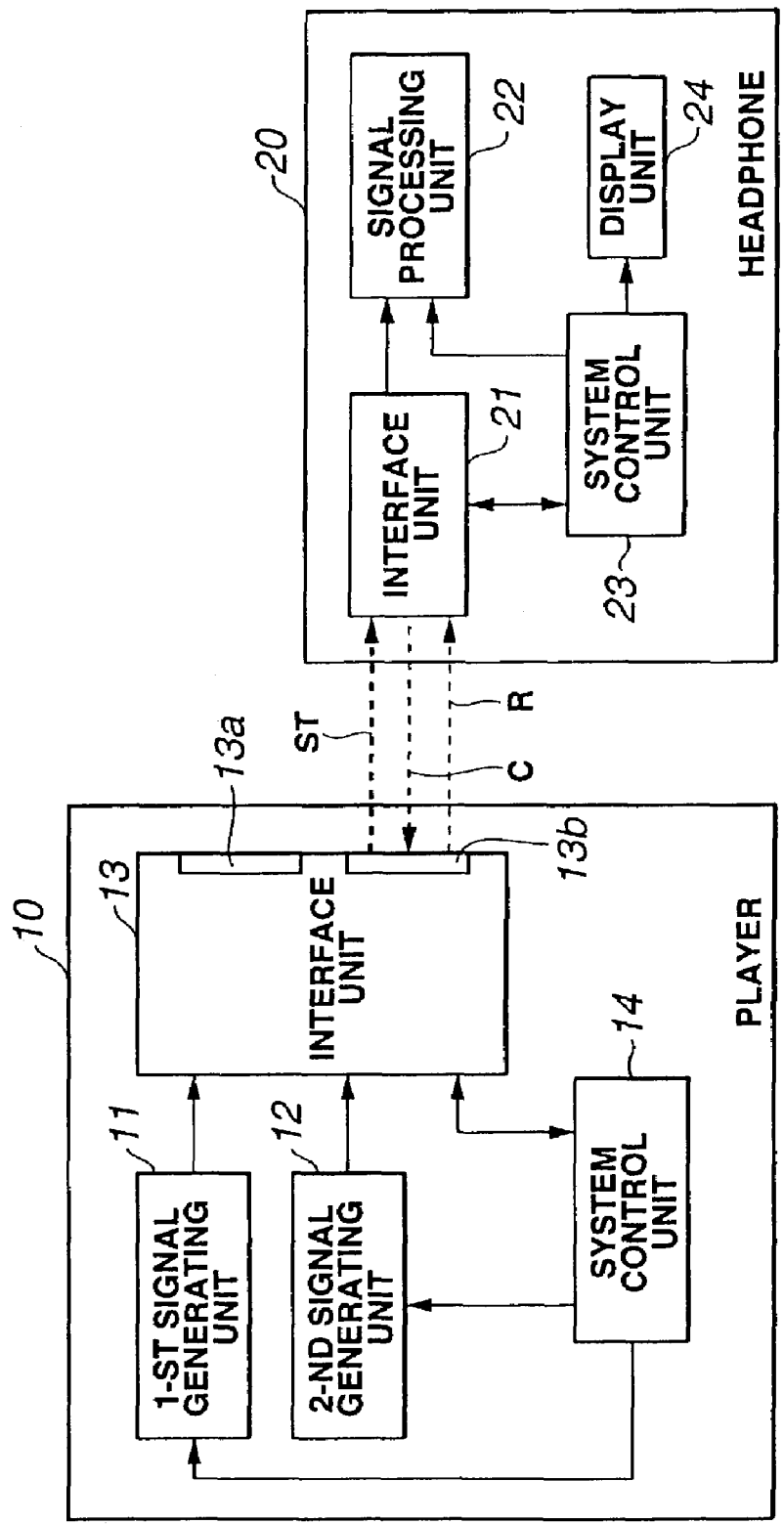
FIG. 9 is a block diagram for explaining the configuration of the playback (reproduction) system.

The playback (reproduction) system 1 comprises, as shown in FIG. 9, the player 10 serving as a first electronic equipment (other electronic equipment) which outputs audio stream generated by plural signal sources, and the headphone 20 serving as a second electronic equipment which can carry out remote control of this player 10, and serves to receive audio stream outputted from the player 10 to output such audio stream to the external as voice. These player 10 and headphone 20 are respectively located as units which logically represent set of physically existing equipments.

The player 10 serves to reproduce audio data recorded at various recording media, and together has a function of audio tuner which receives audio data from the external. The player 10 includes a first signal generating unit 11 which is signal generating means serving as signal source of stream to perform primary function, i.e., to reproduce audio data from the recording medium to thereby transmit the audio data to the external, a second signal generating unit 12 which is signal generating means serving as signal source of stream to receive audio data as audio tuner to thereby transmit the audio data to the external, an interface unit 13 for carrying out transmission/reception of command and response and transmission of audio streams generated by the first signal generating unit 11 and the second signal generating unit 12, and a system control unit 14 for controlling these respective units.

The first signal generating unit 11 serves to reproduce audio data recorded with respect to various recording media, e.g., disc-shaped recording medium such as CD (Compact Disc), DVD (Digital Versatile Disc) or MD (Mini Disc), etc. tape-shaped recording medium, and/or thin type semiconductor memory caused to be in substantially plate form. This first signal generating unit 11 is a unit which is lower rank concept of the player 10 and is located as subunit representing set for realizing logical function of equipment. The first signal generating unit 11 reproduces audio data under control of the system control unit 14 to thereby function as signal source. The first signal generating unit 11 delivers generated data to the interface unit 13.

The second signal generating unit 12 serves to receive audio data from the external as an audio tuner, such as, for example, radio set, etc. This second signal generating unit 12 is located as subunit similarly to the first signal generating unit 11. The second signal generating unit 12 receives audio data under control of the system control unit 14 to output the audio data to thereby function as signal source. The second signal generating unit 12 delivers generated data to the interface unit 13.

The interface unit 13 receives command C transmitted from the headphone 20 in accordance with protocol in the above-described Bluetooth specification to deliver this command C to the system control unit 14. Moreover, the interface unit 13 transmits response R with respect to the command C generated by the system control unit 14 to the headphone 20, and transmits stream ST caused to be in a packet form delivered from the first signal generating unit 11 or the second signal generating unit 12 to the headphone 20. Here, the interface unit 13 is provided with two Bluetooth output plugs 13a, 13b as the above-described plug so as to have ability to output two signal sources, i.e., streams ST caused to be in a packet form delivered from the first signal generating unit 11 and the second signal generating unit 12 to assign respective streams ST. In this example, it is assumed that Bluetooth output plug 13a is assigned as interface with respect to stream within the equipment outputted from the first signal processing unit 11, and Bluetooth output plug 13b is assigned as interface with respect to stream within the equipment outputted from the second signal generating unit 12.

The system control unit 14 analyses command C transmitted from the headphone 20 and received by the interface unit 13 to operate the first signal generating unit 11 or the second signal generating unit 12 in accordance with this command C, and generates response R with respect to the command C to deliver the response R to the interface unit 13.

Such player 10 operates in accordance with command C transmitted from the headphone 20. In the case where the command C is command indicating that audio data recorded with respect to the recording medium is reproduced, the player 10 operates the first signal generating unit 11 under control of the system control unit 14. In the case where the command C is command indicating that audio data is received by the tuner, the player 10 operates the second signal generating unit 12 under control of the system control unit 14. Here, the player 10 is provided with Bluetooth output plugs 13a, 13b respectively corresponding to the first signal generating unit II and the second signal generating unit 12 to cause these plugs to be interface with respect to stream within the equipment.

Figure 10:
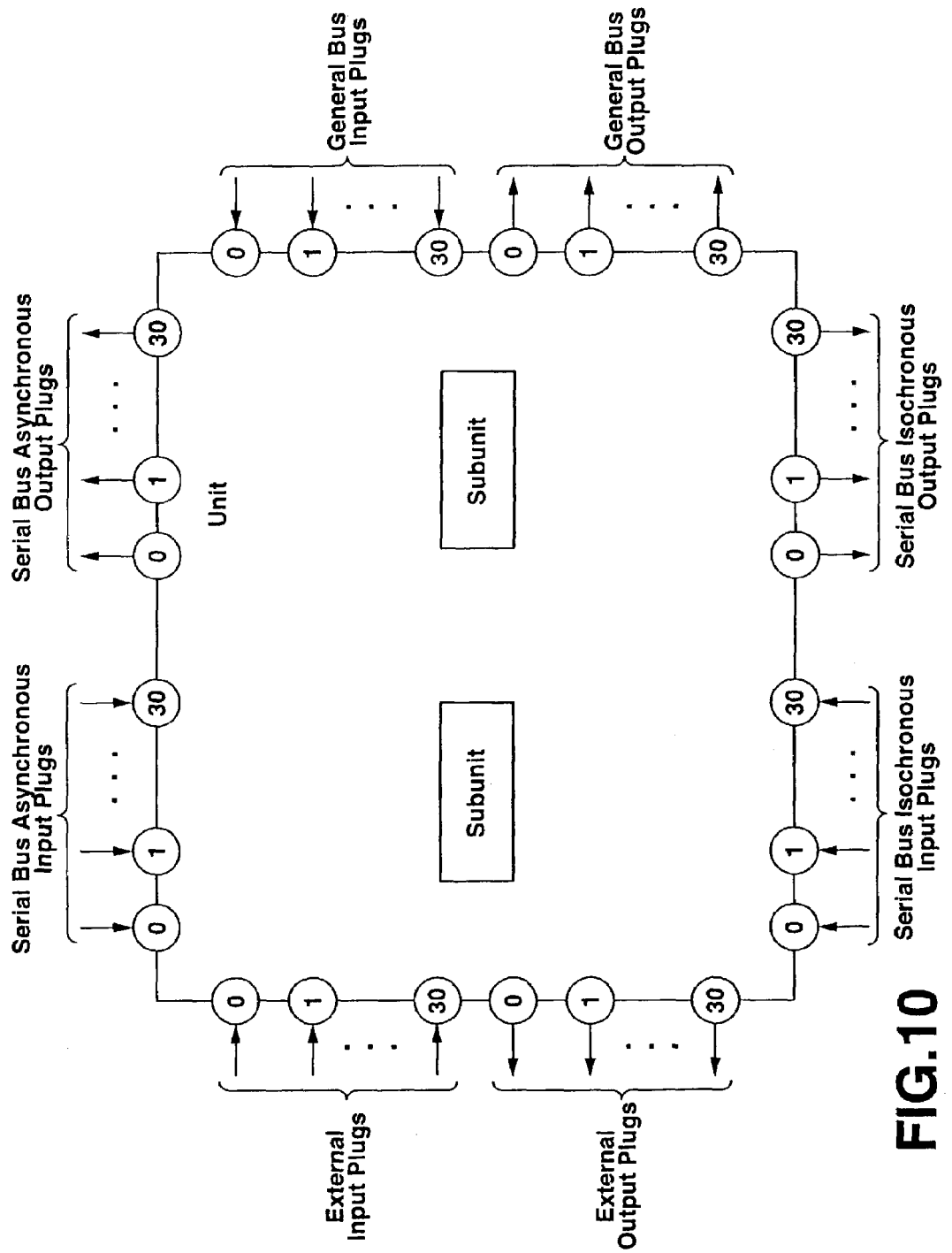
FIG. 10 is a view for explaining unit model in which AV/C unit model is extended.

Namely, in the playback (reproduction) system 1, as shown in FIG. 10, the AV/C unit model is extended to newly prescribe, as plugs used for data transmission by general bus including Bluetooth, 31 General Bus Input Plugs and 31 General Bus Output Plugs in addition to Serial Bus Isochronous Input Plugs, Serial Bus Isochronous Output Plugs, Serial Bus Asynchronous Input Plugs, Serial Bus Asynchronous Output Plugs, External Input Plugs, and External Output Plugs which have been already prescribed in the AV/C unit model.

In more practical sense, as shown in the following Table 1, addresses are assigned to these plugs. Thus, plug numbers are discriminated. Additionally, "16" of the bottom attached character in the above-mentioned Table indicates that addresses are described by hexadecimal number. Namely, in the playback (reproduction) system 1, partial address values $C0_{16}$-$DF_{16}$ of unused address values $C0_{16}$-$FC_{16}$ which are caused to be reserved address for expansion of addresses which are already prescribed as unit plug in the AV/C are newly prescribed as 31 General Bus input/output plugs used in general bus including Bluetooth, and these General Bus input/output plugs are used as Bluetooth input/output plugs. In the player 10, predetermined two address values are assigned as Bluetooth output plugs 13a, 13b among these 31 General Bus output plugs. In the player 10, these Bluetooth output plugs 13a, 13b and the first and second signal generating units 11 and 12 are respectively connected fixedly or after suitably undergone switching, whereby transmission path of stream within the player 10 is established.

TABLE 1

| Value | Unit Input Plug | Unit Output Plug |
|---|---|---|
| $00_{16}$-$1E_{16}$ | Serial Bus Input Plug 0-30 (iPCR 0-30) | Serial Bus Output Plug 0-30 (oPCR 0-30) |
| $1F_{16}$-$7E_{16}$ | Reserved | Reserved |
| $7F_{16}$ | Any available Serial Bus Input Plug | Any available Serial Bus Output Plug |

TABLE 1-continued

| Value | Unit Input Plug | Unit Output Plug |
|---|---|---|
| $80_{16}$-$9E_{16}$ | External Input Plug 0-30 | External Output Plug 0-30 |
| $9F_{16}$ | Reserved | Reserved |
| $A0_{16}$-$BE_{16}$ | Serial Bus Asynchronous Input Plug 0-30 | Serial Bus Asynchronous Output Plug 0-30 |
| $BF_{16}$ | Any available Serial Bus Asynchronous Input Plug | Any available Serial Bus Asynchronous Output Plug |
| $C0_{16}$-$DE_{16}$ | General Bus Input Plug 0-30 | General Bus Output Plug 0-30 |
| $DF_{16}$ | Any available General Bus Input Plug | Any available General Bus Output Plug |
| $E0_{16}$-$FC_1$ | Reserved | Reserved |
| $FD_{16}$ | Reserved | Multiple Plug |
| $FE_{16}$ | Invalid | Invalid |
| $FF_{16}$ | Any available External Input Plug | Any available External Output Plug |

On the other hand, as described above, the headphone 20 additionally includes a remote controller 30 for carrying out remote control of the player 10, and functions as an external output equipment which receives audio stream outputted from the player 10 to output it as voice. The headphone 20 includes an interface unit 21 for carrying out transmission/reception of command and response and/or reception of audio stream transmitted from the player 10, a signal processing unit 22 for processing received audio stream, a system control unit 23 serving as command generating means and response analysing means for controlling respective units, and a display unit 24 for displaying various information.

The interface unit 21 receives stream ST transmitted from the player 10 in accordance with protocol in the above-described Bluetooth to deliver this stream to the signal processing unit 22. Moreover, the interface unit 21 transmits command C generated by the system control unit 23 to the player 10, and receives response R with respect to the command C transmitted from the player 10 to deliver the response R to the system control unit 23.

The signal processing unit 22 implements a predetermined processing to stream delivered from the interface unit 21 under control of the system control unit 23 to output it from speaker (not shown) to the external as voice.

The system control unit 23 generates command C to deliver it to the interface unit 21. Moreover, the system control unit 23 analyses response R transmitted from the player 10 and received by the interface unit 21 to operate the signal processing unit 22 in accordance with this response R, and generates information for allowing display unit 24 which will be described later to carry out display.

The display unit 24 displays information indicating signal source on the basis of information delivered from the system control unit 23. For example, the display unit 24 is operative so that in the case where the operating state of the player 10 is such that audio data is reproduced by the first signal generating unit 11, it displays information of "disc playback", and in the state where the operating state of the player 10 is such that audio data is received by the second signal generating unit 12, it displays information of "tuner receiving".

Such headphone 20 carries out setup of connection to and from the player 20 as the above-described initiator, and transmits command C by the remote controller 30 when connection is established. Further, the headphone 20 receives stream ST transmitted from the player 10 to output it as voice to the external. In addition, the headphone 20 receives response R transmitted from the player 10 in accordance with command C transmitted by the remote controller 30 to carry out processing corresponding to this response R.

Meanwhile, in such playback system 1, the headphone 20 can grasp SEID with respect to receiving stream ST in the process where connection by AVDTP is established between the headphone 20 and the player 10 as described later. Moreover, as described later, the headphone 20 transmits command for inquiring internal connection by AVCTP to the player 10, thereby also making it possible to grasp subunit to which Bluetooth output plug 13a or 13b is connected, i.e., either the first signal generating unit 11 or the second signal generating unit 12 to which Bluetooth output plug 13a or 13b is connected. For this reason, if the headphone 20 can grasp the relationship between SEID and Bluetooth output plug No., it can display information of signal source, e.g., the above-described "disc playback" or "tuner receiving" on the display unit 24.

In view of the above, in the playback system 1, command for inquiring mapping of SEID and Bluetooth output plug No. and response thereof are newly prescribed to carry out correlating between SEID and Bluetooth output plug No. by using the inquiry command and the response. In this example, inquiry commands and responses by four kinds of definitions are newly proposed.

First, the inquiry command and the response by the first definition will be described. The inquiry command and the response by the first definition are realized by incorporation newly carried out into regular AV/C command and AV/C response.

Command frame of inquiry command for inquiring information relating to input plug is constituted as shown in FIG. 11. Namely, this command frame is such that "0000" indicating "AV/C" is stored as command transaction set field (Command Transaction Set; cts), "status" indicating command for inquiring status of equipment is stored as command type field (Command type; ctype), and information for identifying unit to be inquired is stored in the state designated as "unit" as subunit type field (subunit_type) and subunit ID field (subunit_ID).

Moreover, this command frame is caused to be of configuration in which opcode field (opcode) is stored in the state where information indicating command for inquiring information relating to input plug is designated as "Setup Network Input Plug", 0-th operand field (Operand [0]) is used as input plug No. field (input_plug) indicating input plug No., the first operand field (Operand [1]) is used as network type field (network_type) indicating kind of network, the second operand field (Operand [2]) is used as length field (length) indicating length of information indicated in the third operand field (Operand [3]) and operand fields succeeding thereto, and the third operand field (Operand [3]) to the n-th operand field (Operand [n]) are used as network type dependent field (network_type_dependent) indicating information for identifying interface with respect to stream between equipments like SEID.

In this example, network type dependent field (network_type_dependent) is caused to be adjustable in order to cope with various networks including Bluetooth. If corresponding area is area from the third operand field (Operand [3]) to the n-th operand field (Operand [n]), field of arbitrary length can be used.

On the other hand, response frame with respect to such inquiry command is constituted as shown in FIG. 12. Namely, this response frame is such that "0000" indicating "AV/C" is stored as command transaction set field (Command Transaction Set; cts), "stable" indicating that equipment is stable is stored as response code field (Response code; response), and information for identifying inquired unit is stored in the state designated as "unit" as subunit type field (subunit_type) and subunit ID field (subunit_ID).

Moreover, this response frame is caused to be of the configuration in which opcode field (opcode) is stored in the state designated as "Setup Network Input Plug", the 0-th operand field (Operand [0]) is used as input plug No. field (input_plug), the first operand field (Operand [1]) is used as network type field (network_type), the second operand field (Operand [2]) is used as length field (length), and the third operand field (Operand [3]) to the n-th operand field (Operand [n]) are used as network type dependent field (network_type_dependent).

Command frame of inquiry command for inquiring information relating to output plug is constituted as shown in FIG. 13. Namely, this command frame is caused to be similar to the command frame of which fundamental configuration is shown in FIG. 11, and is caused to be of the configuration in which opcode field (opcode) is stored in the state where information indicating command for inquiring information relating to output plug is stored in the state designated as "Setup Network Output Plug", and the 0-th operand field (Operand [0]) is used as output plug No. field (Output_plug) indicating output plug No.

On the other hand, response frame with respect to such inquiry command is constituted as shown in FIG. 14. Namely, this response frame is caused to be the same as the response frame of which fundamental configuration is shown in FIG. 12, and is caused to be of the configuration in which opcode field (opcode) is stored in the state designated as "Setup Network Output Plug", and the 0-th operand field (Operand [0]) is used as output plug No. field (Output_plug).

As described above, inquiry command and response by the first definition are adapted so that incorporation into regular AV/C command and AV/C response is newly carried out to thereby eliminate the possibility that there result command and response peculiar to general buss including Bluetooth, thus making it possible to follow control by the regular AV/C command and AV/C response.

In order to give explanation in more practical sense, inquiry command for inquiring mapping of SEID and Bluetooth output plug No. and response thereof are taken as an example.

As a first example of the first definition, explanation will be given in connection with the case where an equipment serving as controller like the headphone 20 in the playback (reproduction) system 1 grasps SEID in the equipment serving as target like the player 10, and inquires Bluetooth output plug No. corresponding to this SEID.

In this case, command frame is caused to be of the configuration in which, e.g., information as shown in FIG. 15 is stored. Namely, the command frame is caused to be of the configuration in which opcode field (opcode) is caused to be "Setup Network Output Plug", the 0-th operand field (Operand [0]) used as output plug No. field (Output plug) is caused to be "FF" in order to demand answer to inquiry, the first operand field (Operand [1]) used as network type field (network_type) is caused to be "$01_{16}$" indicating "Bluetooth Network", the second operand field (Operand [2]) used as length field (length) is caused to be value "$01_{16}$" indicating 1 byte, and the third operand field (Operand [3]) used as network type dependent field (network_type_dependent) is caused to be value "$12_{16}$" indicating grasped "SEID". Additionally, fields from the fourth operand field (Operand [4]) to the n-th operand field (Operand [n]) are not used because value "$01_{16}$" indicating 1 byte is stored at length field (length), and command frame is caused to be of the configuration in which value "$12_{16}$" indicating "SEID" is stored at the third operand field (Operand [3]) consisting of 1 byte.

On the other hand, response frame is caused to be of the configuration in which, e.g., information as shown in FIG. 16 is stored. Namely, the response frame is caused to be of the configuration in which the 0-th operand field (Operand [0]) used as output plug No. field (Output_plug) is caused to be value "$C1_{16}$" indicating "General Bus" as response to inquiry. Here, general bus output plug is plug which has been already explained by using FIG. 10, and the value "$C1_{16}$" is address defined in the Table 1.

In the case where the equipment serving as controller grasps SEID in a manner as stated above, it generates command in which value of output plug No. field (Output_plug) is caused to be "FF" to transmit this command to the target equipment. Further, the target equipment generates response in which Bluetooth output plug No. corresponding to SEID is stored as output plug No. field (Output_plug) to transmit this response to the equipment serving as controller. For example, in the playback (reproduction) system 1, the headphone 20 generates command C to transmit it to the player 10, and the player 10 generates response R to transmit it to the headphone 20. Thus, the headphone 20 can grasp the relationship between this SEID and Bluetooth output plug No. on the basis of the grasped SEID.

Subsequently, as a second example in the first definition, explanation will be given in connection with the case where an equipment serving as controller like the headphone 20 in the playback (reproduction) system 1 grasps general bus output plug No. in the equipment serving as target like the player 10, and inquires information for identifying interface with respect to stream between equipments corresponding to this general bus output plug No.

In this case, command frame is caused to be of the configuration in which, e.g., information as shown in FIG. 17 is stored. Namely, the command frame is caused to be of the configuration in which opcode field (opcode) is caused to be "Setup Network Output Plug", the 0-th operand field (Operand [0]) used as output plug No. field (Output_plug) is caused to be value "$C1_{16}$" indicating grasped "General Bus", the first operand field (Operand [1]) used as network type field (network_type) and the second operand field (Operand [2]) used as length field (length) are cause to be "FF" in order to demand answer to inquiry. Additionally, fields from the third operand field (Operand [3]) to the n-th operand field (Operand [n]) are not used. In addition, the reason why network type field (network_type) and length field (length) are caused to be "FF" is that it is impossible to grasp kind of network at the stage where equipment serving as controller grasps only information of output plug, and cannot also grasp, followed by this, information for identifying interface with respect to stream between equipments stored at fields succeeding to the third operand field (Operand [3]) as response.

On the other band, response frame is caused to be of the configuration in which, e.g., information as shown in FIG. 18 is stored. Namely, the response frame is caused to be of the configuration in which the first operand field (Operand [1]) used as network type field (network_type) is caused to be value "$01_{16}$" indicating "Bluetooth" as response to inquiry, the second operand field (Operand [2]) used as length field (length) is caused to be value "$01_{16}$" indicating 1 byte as answer to inquiry, and the third operand field (Operand [3]) used as network type dependent field (network_type_dependent) is caused to be value "$12_{16}$" indicating "SEID". Additionally, fields from the fourth operand field (Operand [4]) to the n-th operand field (Operand [n]) are not used because value "$01_{16}$" indicating 1 byte is stored at length field (length), and the response frame is caused to be of the configuration in which value "$12_{16}$" indicating "SEID" is stored at the third operand field (Operand [3]) consisting of 1 byte.

In the case where an equipment serving as controller grasps general bus output plug No. in a manner as stated above, it generates command in which values of network type field (network_type) and length field (length) are caused to be "FF" to transmit this command to the target equipment. Further, the target equipment generates response in which information indicating kind of network used for transmission of stream is stored as network type field (network_type), information indicating length of information for identifying interface with respect to stream between equipments is stored as length field (length), and information for identifying interface corresponding to general bus output plug No. is stored as network type dependent field (network_type dependent) to transmit this response to an equipment serving as controller. For example, in the playback (reproduction) system 1, the headphone 20 generates command C to transmit it to the player 10 and the player 10 generates response R to transmit it to the headphone 20. Thus, the headphone 20 can grasp the relationship between grasped general bus output plug No. and information for identifying interface.

Subsequently, inquiry command and response by the second definition will be described. Command frame of inquiry command for inquiring information relating to input plug is constituted as shown in FIG. 19. Namely, this command frame is such that "0000" indicating "AV/C" is stored as command transaction set field (Command Transaction Set; cts), "status" indicating command for inquiring status of equipment is stored as command type field (Command type; ctype), and information for identifying unit to be inquired is stored in the state designated as "unit" as subunit type field (subunit_type) and subunit ID field (subunit_ID).

Moreover, this command frame is caused to be of the configuration in which opcode field (opcode) is stored in the state where information indicating command for inquiring information relating to input plug is designated as "General Bus Setup", the 0-th operand field (Operand [0]) is used as bus type field (bus_type) indicating kind of network, and the first field operand field (Operand [1]) to the n-th operand field (Operand [n]) are used as bus type dependent field (bus_type_dependent) indicating correspondence with information for identifying interface with respect to steam between equipments like General Bus Plug and SEID.

Here, with respect to bus type dependent field (bus_type_dependent), field length and data configuration are defined every bus in order to cope with various buses including Bluetooth network.

On the other hand, response frame with respect to such inquiry command is constituted as shown in FIG. 20. Namely, this response frame is such that "0000" indicating "AV/C" is stored as command transaction setfield (Command Transaction Set; cts), "stable" indicating that equipment is stable is stored as response code field (Response code; response), and information for identifying inquired unit is stored in the state designated as "unit" as subunit type field (subunit_type) and subunit ID field (subunit_ID).

Further, this response frame is caused to be of the configuration in which opcode field (opcode) is stored in the state designated as "General Bus Setup", the 0-th operand field (Operand [0]) is used as bus type field (bus_type), and the first operand field (Operand [1]) to the n-th operand field (Operand [n]) are used as bus type dependent field (bus_type_dependent).

As stated above, the inquiry command and the response by the second definition are adapted so that incorporation into regular AV/C command and AV/C response is newly carried out to eliminate the possibility that there result command and response peculiar to general buss including Bluetooth, thus making it possible to follow control by the regular AV/C command and AV/C response.

In order to give explanation in more practical sense, inquiry command for inquiring mapping of SEID and Bluetooth output plug No. and response thereof are taken as an example.

As a first example in the second definition, explanation will be given in connection with the case where an equipment serving as controller like the headphone 20 in the playback (reproduction) system 1 grasps SEID in the target equipment like the player 10, and inquires Bluetooth output plug No. corresponding to this SEID.

In this case, command frame is caused to be of the configuration in which, e.g., information as shown in FIG. 21 is stored. Namely, the command frame is such that opcode field (opcode) is caused to be "General Bus Setup", and the 0-th operand field (Operand [0]) used as bus type field (bus_type) is caused to be value "$40_{16}$" indicating "Bluetooth network" and is used as bus type dependent field (bus_type_dependent). At the first operand field (Operand [1]), it is designated that corresponding plug is Output Plug. The second operand field (Operand [2]) is caused to be "$FF_{16}$" in order to demand answer to inquiry. In addition, the third operand field (Operand [3]) is caused to be value "$12_{16}$" indicating grasped "SEID".

On the other hand, response frame is caused to be of the configuration in which, e.g., information as shown in FIG. 22 is stored. Namely, the response frame is caused to be of the configuration in which the second operand field (Operand [2]) used as plug No. field is caused to be value "$C1_{16}$" indicating "General Bus Plug" as answer to inquiry. Here, General Bus Output Plug is plug which has been already explained by using FIG. 10, and the value "$C1_{16}$" is address defined in the Table 1.

In the case where an equipment serving as controller grasps SEID in a manner stated above, it generates command in which value of plug No. field is caused to be "FF" to transmit this command to the target equipment. Further, the target equipment generates response in which Bluetooth output plug No. corresponding to SEID is stored as plug No. field to transmit this response to the equipment serving as controller. For example, in the playback (reproduction) system 1, the headphone 20 generates command C to transmit it to the player 10, and the player 10 generates response R to transmit it to the headphone 20. Thus, the headphone 20 can grasp the relationship between this SEID and Bluetooth output plug No. on the basis of the grasped SEID.

Subsequently, as a second example in the second definition, explanation will be given in connection with the case where an equipment serving as controller like the headphone 20 in the playback system 1 grasps general bus output plug No. in the target equipment like the player 10, and inquires information for identifying interface with respect to stream between equipments corresponding to this general bus output plug No.

In this case, command frame is caused to be of configuration in which, e.g., information as shown in FIG. 23 is stored. Namely, the command frame is caused to be of the configuration in which opcode field (opcode) is caused to be "General Bus Setup", the 0-th operand field (Operand [0]) used as bus type field (bus_type) is caused to be value "$40_{16}$" indicating "Bluetooth", Output is designated by the first operand field (Operand [1]) used as input/output plug (Input/Output) designation, the second operand field (Operand [2]) used as plug No. is caused to be value "$C1_{16}$" indicating General Bus Plug #1, and the third operand field (Operand [3]) is caused to be "$FF_{16}$" in order to demand answer to inquiry.

On the other hand, response frame is caused to be of the configuration in which, e.g., information as shown in FIG. 22 is stored. Namely, the response frame is caused to be of the configuration in which the third operand field (Operand [3]) is caused to be value "$12_{16}$" indicating "SEID".

In the case where the equipment serving as controller grasps General Bus input/output plug No. in a manner stated above, it generates command in which value of field indicating stream end point of each bus defined by bus type dependent field (bus_type_dependent) is caused to be "FF" to transmit this command to the target equipment. Further, the target equipment generates response in which information for identifying interface corresponding to General Bus input/output plug No. is stored to transmit this response to the equipment serving as controller. For example, in the playback (reproduction) system 1, the headphone 20 generates command C to transmit it to the player 10, and the player 10 generates response R to transmit it to the headphone 20. Thus, the headphone 20 can grasp the relationship between grasped general bus output plug No. and information for identifying interface.

Subsequently, inquiry command and response by the third definition will be described. The inquiry command and response by the third definition is such that AV/C command is extended to define another command set to carry out definition as command peculiar to Bluetooth network.

Figure 24:
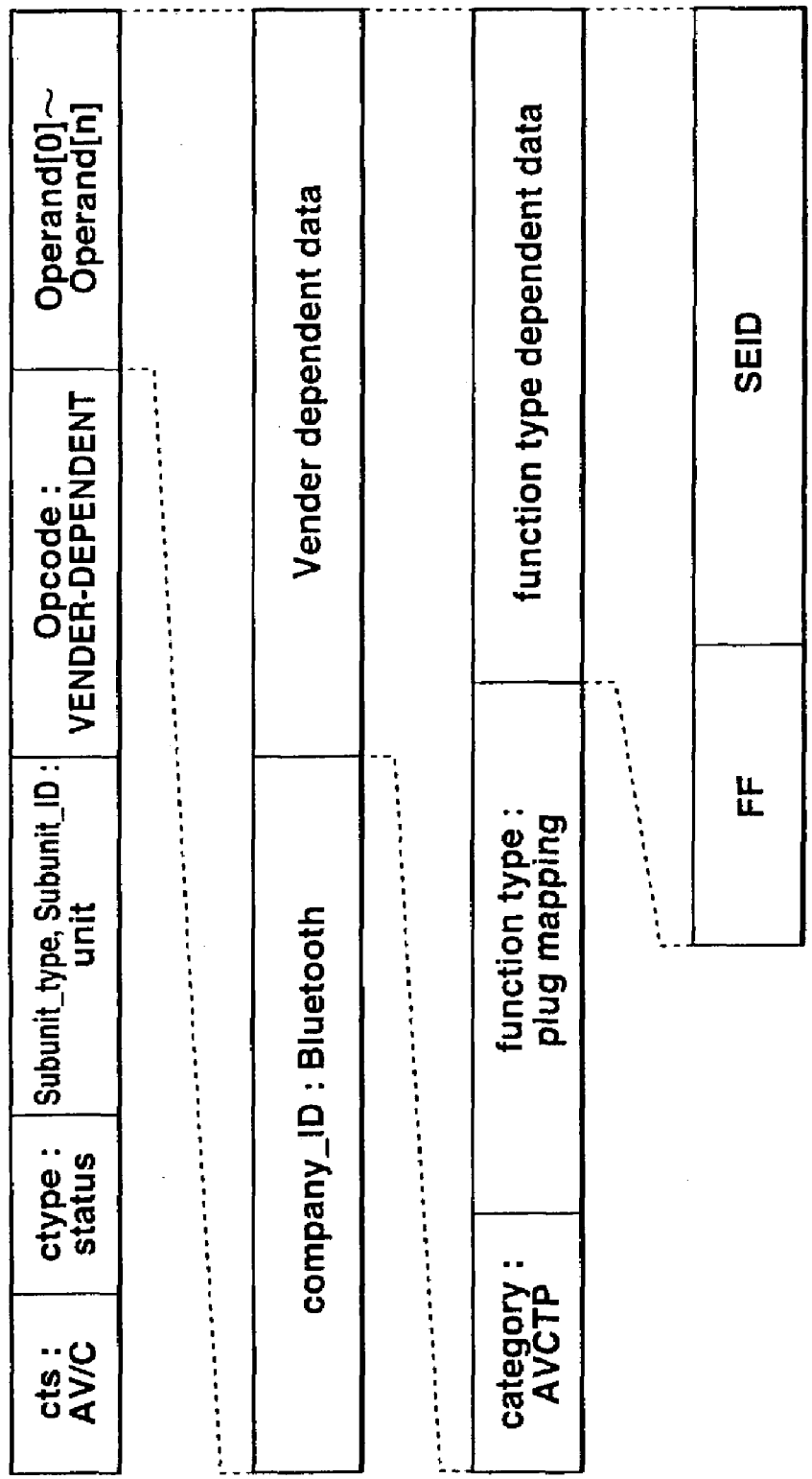
FIG. 24 is a view for explaining the configuration of command frame of inquiry command by the first definition for inquiring mapping of SEID and Bluetooth output plug No.

Command frame of inquiry command is constituted as shown in FIG. 24. Namely, this command frame is such that "0000" indicating "AV/C" is stored as command transaction set field (Command Transaction Set; cts), "status" indicating command for inquiring status of equipment is stored as command type field (Command type; ctype), information for identifying unit to be inquired is stored in the state designated as "unit" as subunit type field (subunit_type) and subunit ID field (subunit_ID), and opcode field (opcode) is stored in the state where information indicating vender dependent command is designated as "VENDER·DEPENDENT".

Moreover, operand field (Operand [0]·Operand [n]) is roughly classified into company ID field (company_ID) and vender dependent data field (Vender dependent data). As the company ID field (company_ID), fields from the 0-th operand field (Operand [0]) to the second operand field (Operand [2]) are used. At the company ID field (company_ID), values indicating inherent identification information for "Bluetooth SIG" are stored.

Further, format of vender dependent data field (Vender dependent data) can be arbitrarily specified by vender, and is used here in the state roughly classified into category field (category), function type field (function type), and function type dependent data field (function type dependent data). At the category field (category), information indicating inquiry of interface in any protocol is stored. In the case where Bluetooth input/output plug is inquired, value indicating "AVCTP" is stored. At function type field (function type), information indicating kind of command is stored, and value indicating "plug mapping" is stored.

Furthermore, the function type dependent data field (function type dependent data) is roughly classsified into Bluetooth input/output plug No. field (Bluetooth plug #) and SEID field (SEID), and either one value among them is stored as "FF". Namely, in the case where SEID is grasped and Bluetooth input/output plug No. corresponding to this SEID is desired to be obtained, "FF" is stored in order to obtain answer to question as Bluetooth input/output plug No. field (Bluetooth plug #) and value of grasped SEID is stored as SEID field (SEID) at function type dependent data field (function type dependent data). Moreover, in the case where Bluetooth input/output plug No. is grasped and SEID corresponding to this Bluetooth input/output plug No. is desired to be obtained, value of grasped Bluetooth input/output plug No. is stored as Bluetooth input/output plug No. field (Bluetooth plug #) and "FF" is stored in order to obtain answer to question as SEID field (SEID) at function type dependent data field (function type dependent data). In this case, Bluetooth input/output plug belongs to General Bus input/output plug which has been already explained by using FIG. 10.

Figure 25:
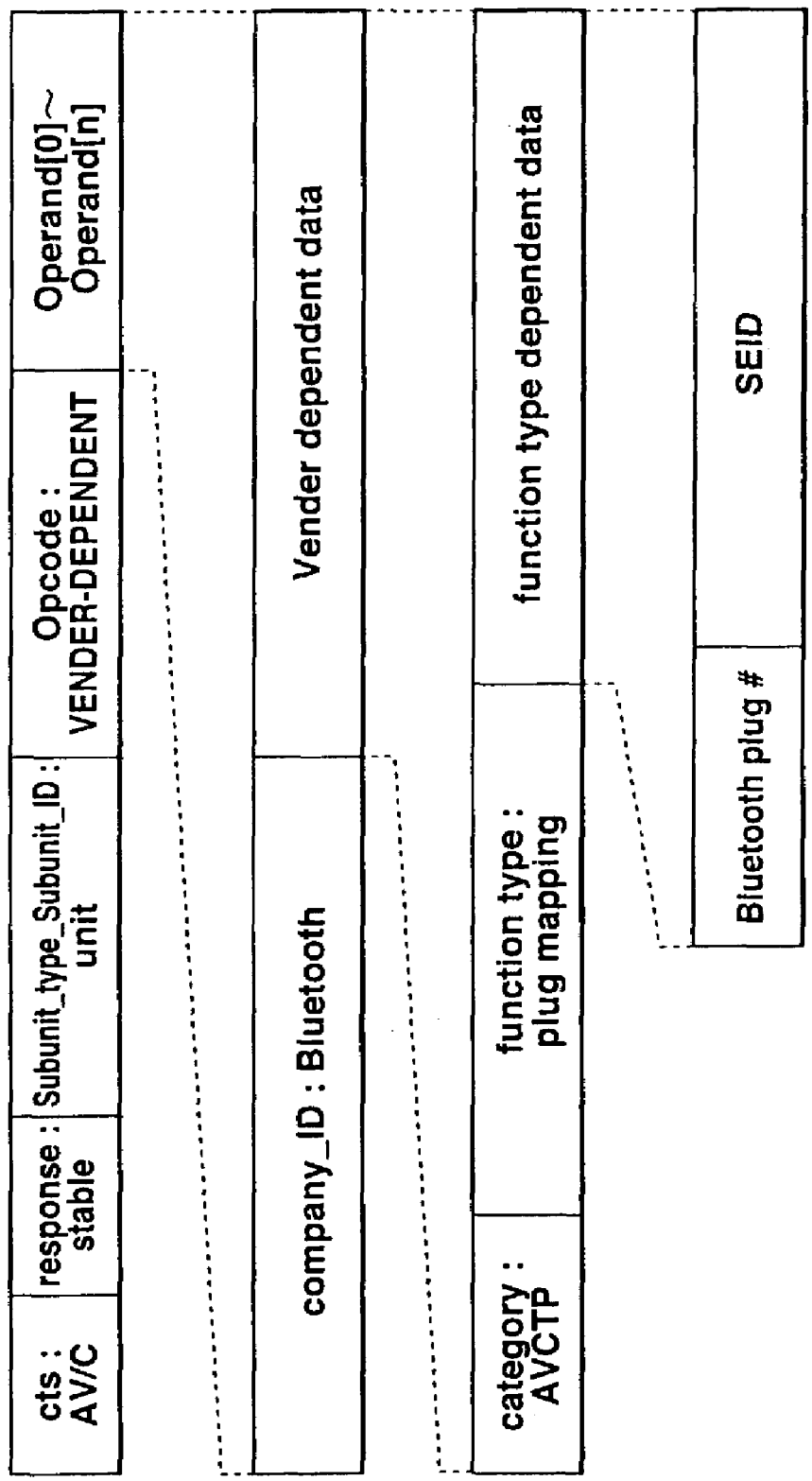
FIG. 25 is a view for explaining the configuration of response frame with respect to the inquiry command shown in FIG. 24.

On the other hand, response frame is caused to be of the configuration in which, e.g., information as shown in FIG. 25 is stored. Namely, the response frame is caused to be of the configuration in which, in the case of response corresponding to command for inquiring Bluetooth input/output plug No. as in the command shown in FIG. 24, Bluetooth input/output plug No. field (Bluetooth plug #) is caused to be value indicating Bluetooth input/output plug No. corresponding to SEID stored in SEID field (SEID) as answer to inquiry. Moreover, the response frame is caused to be of the configuration in which, in the case of response corresponding to command for inquiring SEID, SEID field (SEID) is caused to be value indicating SEID corresponding to Bluetooth input/output plug No. stored in Bluetooth input/output plug No. field (Bluetooth plug #) as answer to inquiry.

As stated above, inquiry command and response by the third definition can be defined as command peculiar to Bluetooth application by using vender dependent command (VENDER-DEPENDENT). An equipment serving as controller generates command in which value of either one of Bluetooth input/output plug No. field (Bluetooth plug #) and SEID field (SEID) is caused to be "FF" to transmit this command to the target equipment. Further, the target equipment generates response in which SEID or Bluetooth input/output plug No. is stored as Bluetooth input/output plug No. field (Bluetooth plug or SEID field (SEID) to transmit this response to the equipment serving as controller. For example, in the playback (reproduction) system 1, the headphone 20 generates command C to transmit it to the player 10, and the player 10 generates response R to transmit it to the headphone 20. Thus, the headphone 20 can grasp the relationship between SEID and Bluetooth output plug No. on the basis of grasped SEID or Bluetooth input/output plug No.

Subsequently, inquiry command and response by the fourth definition will be described. In the inquiry command and response by the fourth definition, AV/C command is extended to define another command set to define it as command peculiar to Bluetooth application.

The command frame of the inquiry command is constituted as shown in FIG. 26. Namely, this command frame is such that value except for "0000" indicating extended command except for "AV/C" is stored as command transaction set field (Command Transaction Set; cts). Here, for convenience, such value is assumed to be "Extended AV/C". Moreover, the command frame is such that "status" indicating command for inquiring status of equipment is stored as command type field (Command type; ctype), information for identifying unit to be inquired is stored in the state designated as "unit" as subunit type field (subunit_type) and subunit ID field (subunit_ID), and information indicating plug mapping command is stored at the opcode field (opcode) in the state designated as "Bluetooth Plug Mapping".

Further, the operand field (Operand [0]·Operand [n]) is roughly classified into Bluetooth input/output plug No. field (Bluetooth plug #) and SEID field (SEID), and either one of value among them is stored as "FF". Namely, in the case where SEID is grasped and Bluetooth input/output plug No. corresponding to this SEID is desired to be obtained, "FF" is stored in order to obtain answer to inquiry as Bluetooth input/output plug No. field (Bluetooth plug #), and value of grasped SEID is stored as SEID field (SEID). In addition, in the case where Bluetooth input/output plug No. is grasped and SEID corresponding to this Bluetooth input/output plug No. is desired to be obtained, value of grasped Bluetooth input/output plug No. is stored as Bluetooth input/output plug No field (Bluetooth plug #), and "FF" is stored in order to obtain answer to inquiry as SEID field (SEID). In this case, Bluetooth input/output plug belongs to general bus input/output plug which has been already explained by using FIG. 10.

Figure 27:
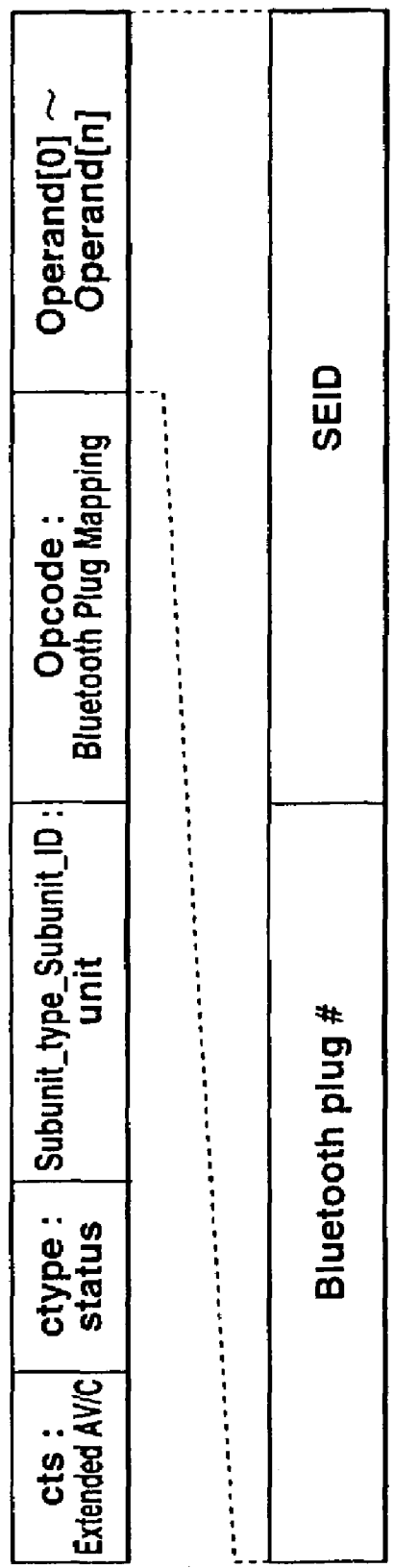
FIG. 27 is a view for explaining the configuration of response frame with respect to the inquiry command shown in FIG. 26.

On the other hand, response frame is caused to be of the configuration in which, e.g., information as shown in FIG. 27 is stored. Namely, the response frame is caused to be of the configuration in which, in the case of response corresponding to command for inquiring Bluetooth input/output plug No. as in the command shown in FIG. 26, Bluetooth input/output plug No. field (Bluetooth plug #) is caused to be value indicating Bluetooth input/output plug No. corresponding to SEID stored in SEID field (SEID) as answer to inquiry. In addition, the response frame is caused to be of the configuration in which, in the case of response corresponding to command for inquiring SEID, SEID field (SEID) is caused to be value indicating SEID corresponding to Bluetooth input/output plug No. stored in Bluetooth input/output plug No. field (Bluetooth plug #).

As stated above, in the inquiry command and the response by the fourth definition, AV/C command is extended to define another command set, thereby making it possible to define it as command peculiar to Bluetooth application. An equipment serving as controller generates command in which either one value of Bluetooth input/output plug No. field (Bluetooth plug #) and SEID field (SEID) is caused to be "FF" to transmit this command to the target equipment. Further, the target equipment generates response in which SEID or Bluetooth input/output plug No. is stored as Bluetooth input/output plug No. field (Bluetooth plug #) or SEID field (SEID) to transmit this response to the equipment serving as controller. For example, in the playback (reproduction) system 1, the headphone 20 generates command C to transmit it to the player 10, and the player 10 generates response R to transmit it to the headphone 20. Thus, the headphone 20 can grasp the relationship between SEID and Bluetooth output plug No. on the basis of grasped SEID or Bluetooth input/output plug No.

Figure 28:
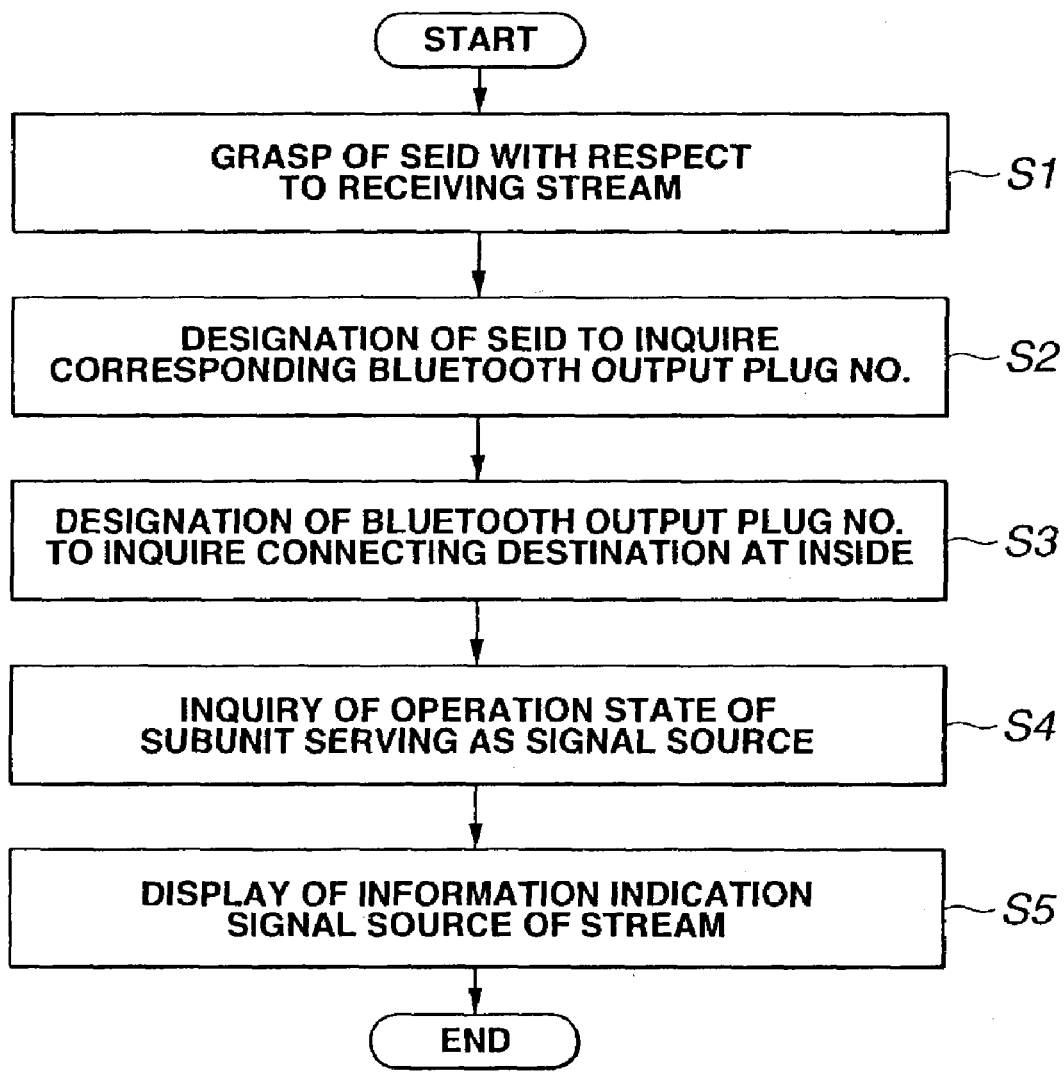
FIG. 28 is a flowchart for explaining a series of processing steps in the playback (reproduction) system, and is a flowchart for explaining a series of processing steps when correlating between Bluetooth input/output plug No. and SEID is carried out and information of signal source of stream is obtained at the receiving side.

Meanwhile, in the playback system 1, such inquiry commands and responses by four kinds of definitions are used to carry out a series of processing as shown in FIG. 28 to thereby carry out correlating between Bluetooth input/output plug No. for identifying Bluetooth input/output plug which is interface with respect to steam within the equipment and SEID for identifying stream end point which is interface with respect to stream between equipments, thus making it possible to obtain information of signal source of stream at the receiving side.

First, in the playback system 1, as shown in the figure, at step S1, connection by AVDTP is established between the headphone 20 serving as controller and the player 10 serving as target by the headphone 20 to thereby grasp SEID with respect to receiving stream.

In more practical sense, the headphone 20 transmits command of signalling to receive response thereof to thereby grasp SEID with respect to receiving stream in the process where connection is established. In order to establish connection between the headphone 20 and the player 10, the headphone 20 first collects "Service_Overview" of the player 10 by using command of "Stream_Info_Overview" which is one of commands of signalling. Subsequently, the headphone 20 selects SEID thereafter to collect "Service_Capability" of SEID by using command of "Stream_Info" which is one of commands of signalling. Further, the headphone 20 selects "Capability" of SEID by using command of "Set_Configuration" which is one of commands of signalling.

In this way, the headphone 20 can establish connection between the headphone 20 and the player 10, and can grasp SEID in that process.

Subsequently, in the playback system 1, at step S2, either one of inquiry commands by the above-described three kinds of definitions is used to designate SEID by the headphone 20 to inquire corresponding Bluetooth output plug No.

Namely, the headphone 20 transmits the inquiry command which has been already shown in FIG. 15, FIG. 24 or FIG. 26 to the player 10 to thereby inquire Bluetooth output plug No. The headphone 20 receives response transmitted from the player 10 to analyse the received response, thereby making it possible to grasp Bluetooth output plug No. corresponding to designated SEID.

Subsequently, in the playback system 1, at step S3, grasped Bluetooth output plug No. is designated by the headphone 20 to inquire connecting destination within the player 10 of this Bluetooth output plug.

Namely, the headphone 20 designates Bluetooth output plug to inquire whether stream outputted from this Bluetooth output plug uses either subunit of the first signal generating unit 11 or the second signal generating unit 12 as signal source. For example, the headphone 20 transmits, to the player 10, connect command (CONNECT command) for examining correspondence relationship between source plug No. (source_plug) and destination plug No. (destination_plug) as command frame is shown in FIG. 29, thereby making it possible to inquire connecting destination within the player 10 of Bluetooth output plug. In this case, in CONNECT command, although not shown, "status" indicating command for inquiring status of equipment is stored as command type field (Command type; ctype). The headphone 20 receives response transmitted from the player 10 to analyse the response, thereby making it possible to grasp connecting destination within the player 10 of Bluetooth output plug.

Subsequently, in the playback system 1, at step S4 in FIG. 28, the operating status of subunit serving as signal source is inquired by the headphone 20.

Namely, the headphone 20 transmits existing AV/C command for inquiring operating state of subunit to the player 10 to thereby inquire operating state of subunit serving as signal source. Here, as the operating state of the first signal generating unit 11, there is operating state of "disc playback", and as the operating of the second signal generating unit 12, there is operating state of "tuner receiving". The headphone 20 receives and analyses response transmitted from the player 10, thereby making it possible to grasp the operating state of subunit serving as signal source.

Further, in the playback system 1, at step S5, information indicating signal source of stream is displayed on the display unit 24 by the headphone 20. Thus, a series of processing are completed.

In the playback system 1, such a series of processing go through to thereby carry out correlating between Bluetooth input/output plug No. for identifying Bluetooth input/output plug serving as interface with respect to stream within the equipment and SEID for identifying stream end point serving as interface with respect to stream between equipments, thus making it possible to obtain information of signal source of stream at the receiving side.

It is to be noted that while a series of processing shown in the figure are indicated in connection with the case where corresponding Bluetooth input/output plug No. is inquired on the basis of SEID, it is a matter of course in the playback system 1 that it is possible to inquire corresponding SEID on the basis of Bluetooth input/output plug No.

As stated above, in the playback system 1, even in the case where plural subunits are caused to serve as signal source like the player 10, the headphone 20 can recognize signal source from which received stream is outputted. Accordingly, the playback system 1 displays information of signal source on the display unit 24 by the headphone 20 to permit user to notice it so that control of the entirety of the playback system 1 can be carried out. Thus, it is possible to provide high convenience for user.

Figure 30:
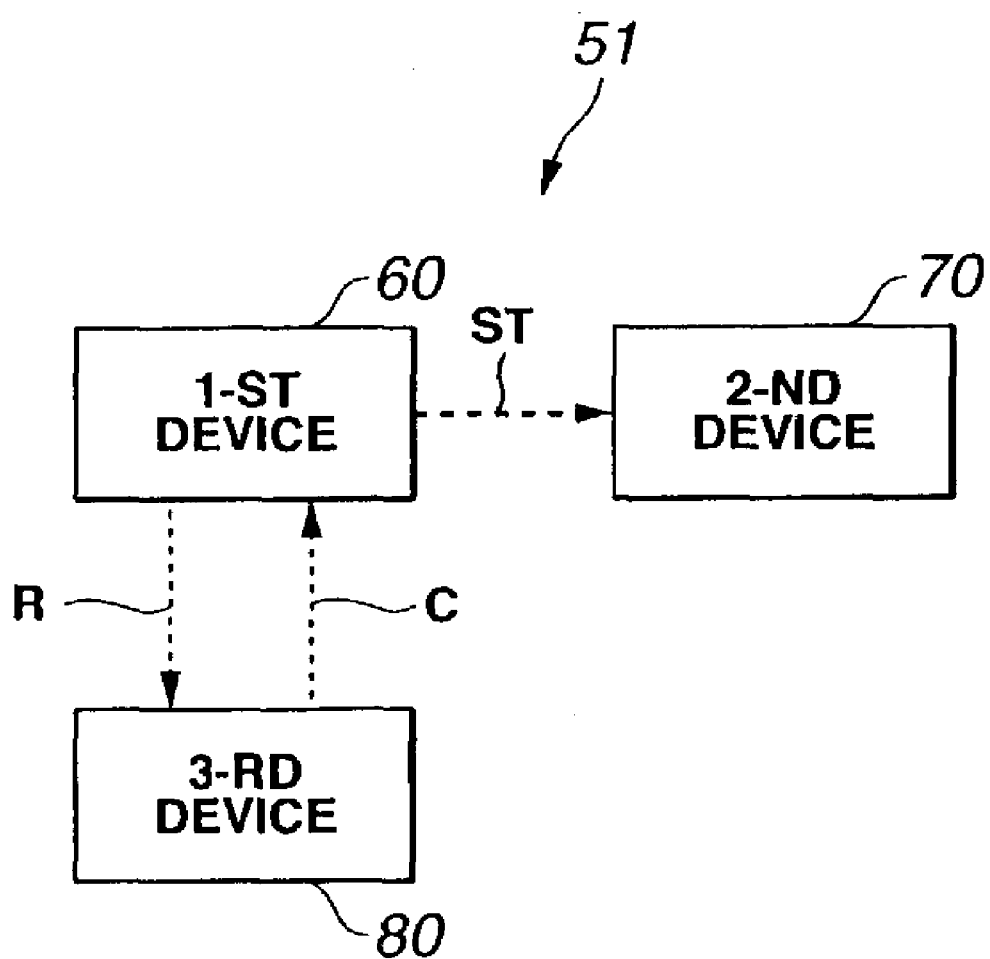
FIG. 30 is a block diagram for explaining the configuration of a data transmission system shown as another embodiment of this invention.

Subsequently, as an example of a data transmission system which is the system proposed at the opening sentence as more practical data transmission system to which Bluetooth is applied, and in which when transmission/reception of stream by Bluetooth is carried out between two equipments, an equipment except for the two equipments is caused to be controller to have ability to control connection between two equipments by this controller, a data transmission system 51 shown in FIG. 30 will be described.

As shown in this figure, this data transmission system 51 serves to carry out transmission/reception of stream ST such as audio stream or video stream, etc. by Bluetooth between a first device 60 and a second device 70 serving as AV equipment. These first and second devices 60 and 70 respectively correspond to the player 10 and the headphone 20 in the above-described playback system 1. It is to be noted that the second device 70 is not a device provided with a controller like the remote controller 30, but is a device which simply receives stream ST transmitted from the first device 60 to process it. In the data transmission system 51, there is used, as a controller, a third device 80 which is a device different from the first device 60 and the second device 70, and is capable of carrying out transmission/reception of data by Bluetooth between the third device 80 and the first device 60. In the data transmission system 51, it is possible to transmit command C generated by command generating means (not shown) in the third device 80 to the first device 60. In accordance with this, it is possible to transmit response R from the first device 60 to the third device 80.

Meanwhile, in such data transmission system 51, the first device 60 and the second device 70 can establish connection by AVDTP between these two equipments similarly to the above-described player 10 and headphone 20. For this reason, ordinarily the third device 80 cannot grasp connection between these first and second devices 60 and 70 by any means. However, in the data transmission system 51, if the third device 80 can grasp connection between these first and second devices 60 and 70, it becomes possible to unitarily control connection between these two equipments.

In view of the above, in the data transmission system 51, command for discovering device in which connection can be made with respect to the first device 60 by the third device 80 and its response are newly prescribed, and command for establishing connection between the first device 60 and the second device 70 by the third device 80 is newly prescribed.

First, command for discovering device in which connection can be made with respect to the first device 60 by the third device 80 and its response will be described.

As such command, command having, e.g., command frame as shown in FIG. 31 is conceivable. Namely, in this command frame, similarly to the inquiry command by the fourth definition used in the above-described playback system 1, AV/C command is extended to define another command set.

In the command frame, value except for "0000" indicating extended command except for "AV/C" is stored as command transaction set field (Command Transaction Set; cts). In this example, for convenience, the extended command except for "AV/C" is caused to be "Extended AV/C". Moreover, in the command frame, "status" indicating command for inquiring status of equipment is stored as command type field (Command type; ctype), information for identifying unit to be inquired is stored in the state designated as "unit" as subunit type field (subunit_type) and subunit ID field (subunit_ID), and information indicating command for discovering device in which connection can be made is stored in the state designated as "Bluetooth Possible Connections" as opcode field (opcode) Further, value for obtaining information of Bluetooth Device ID which will be described below as response is stored as "FF" at operand field (Operand [0]·Operand [n]).

Figure 32:
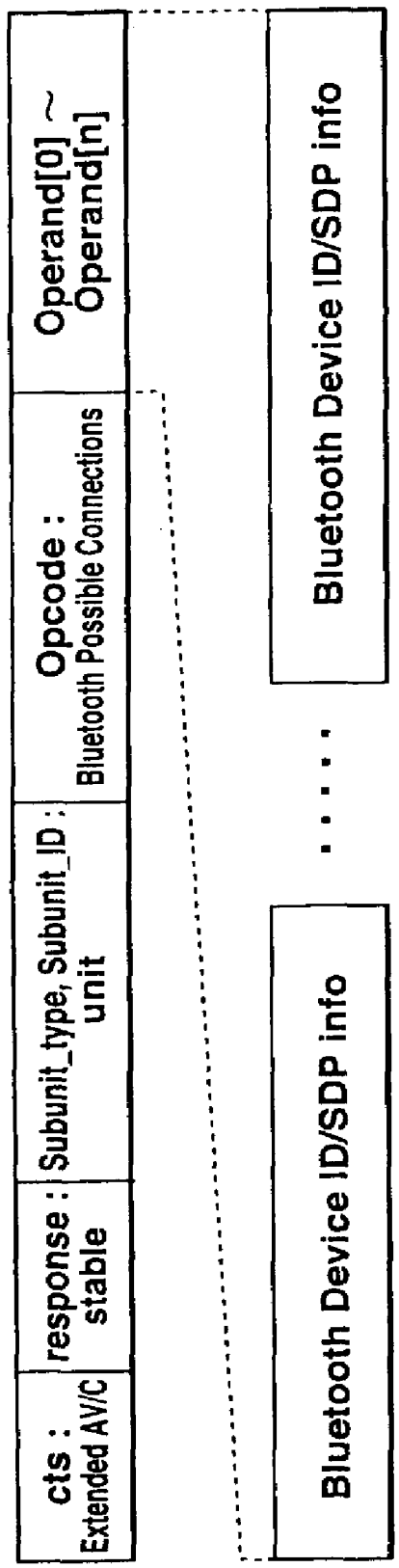
FIG. 32 is a view for explaining the configuration of response frame with respect to the command shown in FIG. 31.

On the other hand, response frame is caused to be of the configuration in which, e.g., information as shown in FIG. 32 is stored. Namely, the response frame is caused to be of the configuration in which operand field (Operand [0]·Operand [n]) is caused to be value indicating Bluetooth Device ID for identifying device in which connection can be made as answer to inquiry. It is to be noted that it is not necessary for response frame to store value indicating Bluetooth Device ID as all operand fields (Operand[0]-Operand [n]), but an arbitrary number of operand fields may be used. Namely, operand fields may be used by the number of discovered devices as device in which connection can be made.

Here, in this figure, values stored in operand fields (Operand [0]-Operand [n]) are caused to be "Bluetooth Device ID/SDP info". This is to clearly express that the first device 60 which has received command discovers device listed up as response by using Bluetooth SDP (Bluetooth Service Discovery Protocol) which is one of protocols prescribed in Bluetooth specification. Namely, when the first device 60 receives command from the third device 80, it discovers device corresponding to Bluetooth AV protocol and device in which offered service corresponds to the first device 60 of devices in which connection can be made by using Bluetooth SDP. In more practical sense, in the case where the first device 60 is a device which transmits audio stream on Bluetooth link, the first device 60 discovers device which can receive audio stream of connection available devices which can handle Bluetooth application by using Bluetooth SDP. It is to be noted that it is not necessarily required for the first device 60 to use Bluetooth SDP, but it is a matter of course that there may be used any device adapted for realizing similar function, i.e., function to discover connection available device.

As stated above, with respect to command and response, AV/C command is extended to have ability to define another command set. The third device 80 serving as controller generates command in which value of operand field (Operand [0]·Operand[n]) is caused to be "FF" to transmit this command to the first device 60. Further, the first device 60 generates response in which value indicating Bluetooth Device ID for identifying connection available device is stored as operand field (Operand [0]·Operand [n]) to transmit this response to the third device 80 serving as controller.

Subsequently, command for establishing connection between the first device 60 and the second device 70 by the third device 80 will be described.

As such command, e.g., command having command frame as shown in FIG. 33 is conceivable. Namely, similarly to the inquiry command by the fourth definition used in the above-described playback system 1, this command frame is such that AV/C command is extended to define another command set.

The command frame is such that value except for "0000" indicating extended command except for "AV/C" is stored as command transaction set field (Command Transaction Set; cts). Here, for convenience, extended command except for "AV/C" is caused to be "Extended AV/C". Moreover, the command frame is such that "status" indicating command for inquiring status of equipment is stored as command type field (Command type; ctype), information for identifying unit to be inquired is stored in the state designated as "unit" as subunit type field (subunit_type) and subunit ID field (subunit_ID), and information indicating command which establishes connection by Bluetooth is stored in the state designated as "Make Bluetooth Connection" as opcode field (opcode). Further, operand fields (Operand [0]-Operand [n]) are caused to be value indicating Bluetooth Device ID for identifying one device that the third device 80 has arbitrarily selected from devices listed up by the response which has been already shown in FIG. 32.

As stated above, in this command, AV/C command is extended to have ability to define another command set. The third device 80 serving as controller generates command in which value of operand field (Operand [0]·Operand [n]) is caused to be arbitrarily selected Bluetooth Device ID to transmit this command to the first device 60. Further, the first device 60 generates response with respect to this command to transmit this response to the third device 80 serving as controller, and carries out processing corresponding to the command.

Figure 34:
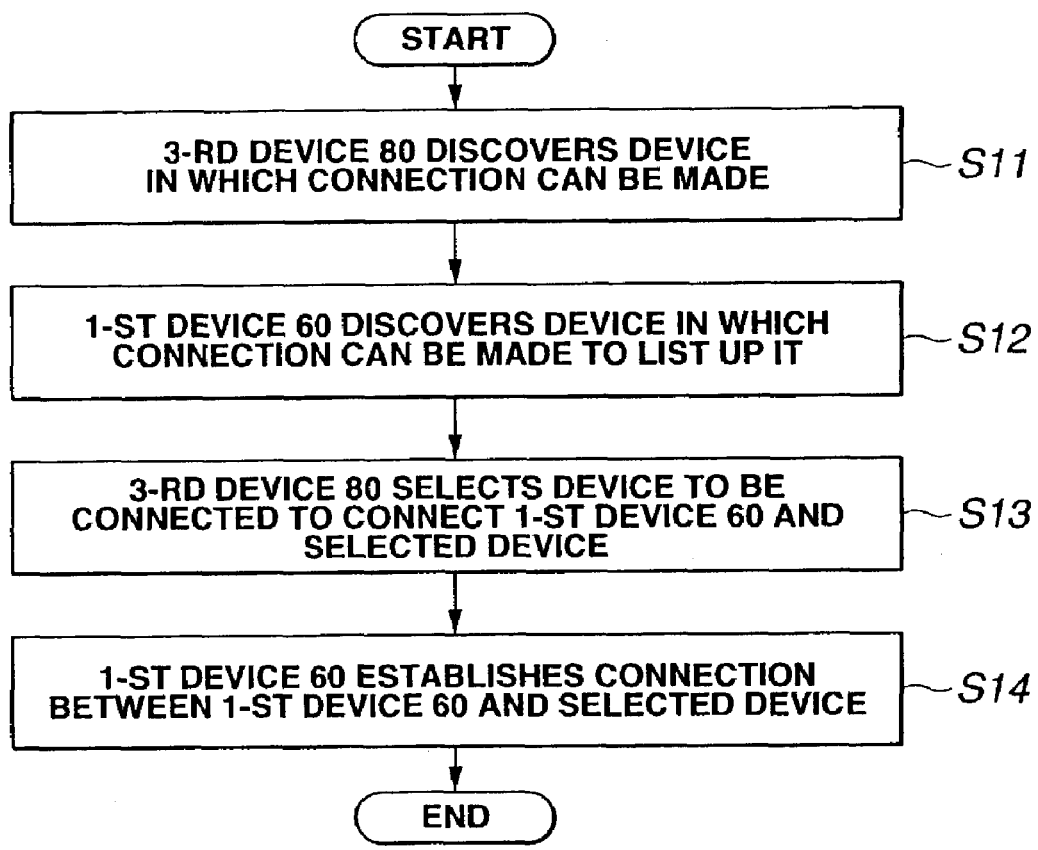
FIG. 34 is a flowchart for explaining a series of processing steps in the data transmission system, and is a flowchart for explaining a series of processing steps when connection between two devices is controlled.

Meanwhile, in the data transmission system 51, such command and response are used to carry out a series of processing as shown in FIG. 34, thereby making it possible to control connection between these first and second devices 60 and 70 by the third device when transmission/reception of stream by Bluetooth is carried out between the first device 60 and the second device 70.

First, in the data transmission system 51, as shown in the figure, at step S11, device in which connection can be made with respect to the first device 60 is discovered by using the command which has been already shown in FIG. 31 by the third device 80 serving as controller. Namely, the third device 80 transmits the command which has been already shown in FIG. 31 to the first device 60.

Subsequently, in the data transmission system 51, at step S12, device in which connection can be made is discovered in accordance with command from the third device 80 by the first device 60 to list up it to generate the response which has been already shown in FIG. 32 to transmit this response to the third device 80. At this time, the first device 60 discovers corresponding device by using Bluetooth SDP as described above.

Subsequently, in the data transmission system 51, at step S13, device caused to be connected to the first device 60 is selected in accordance with response from the first device 60 by the third device 80 to connect the first device 60 and this device by using the command which has been already shown in FIG. 33. Namely, the third device 80 transmits the command which has been already shown in FIG. 33 to the first device 60.

Further, in the data transmission system 51, at step S14, connection by AVDTP is established between the first device 60 and device selected by the third device 80, i.e., the second device 70 in this example by the first device 60. At this time, the first device 60 establishes connection by signalling as has been explained at the step S1 in FIG. 28. The first device 60 transmits information indicating result when establishment of connection is tried to the third device 80 as response to complete a series of processing.

In the data transmission system 51, such a series of processing go through, thereby making it possible to control connection between these first and second devices 60 and 70 by the third device 80 when transmission/reception of stream on Bluetooth link is carried out between the first device 60 and the second device 70.

As stated above, the data transmission system 51 can control connection between two equipments by equipment except for two equipments which carries out transmission/reception of stream. Accordingly, the data transmission system 51 can unitarily control connection between two equipments, and can provide high convenience for user.

Figure 35:
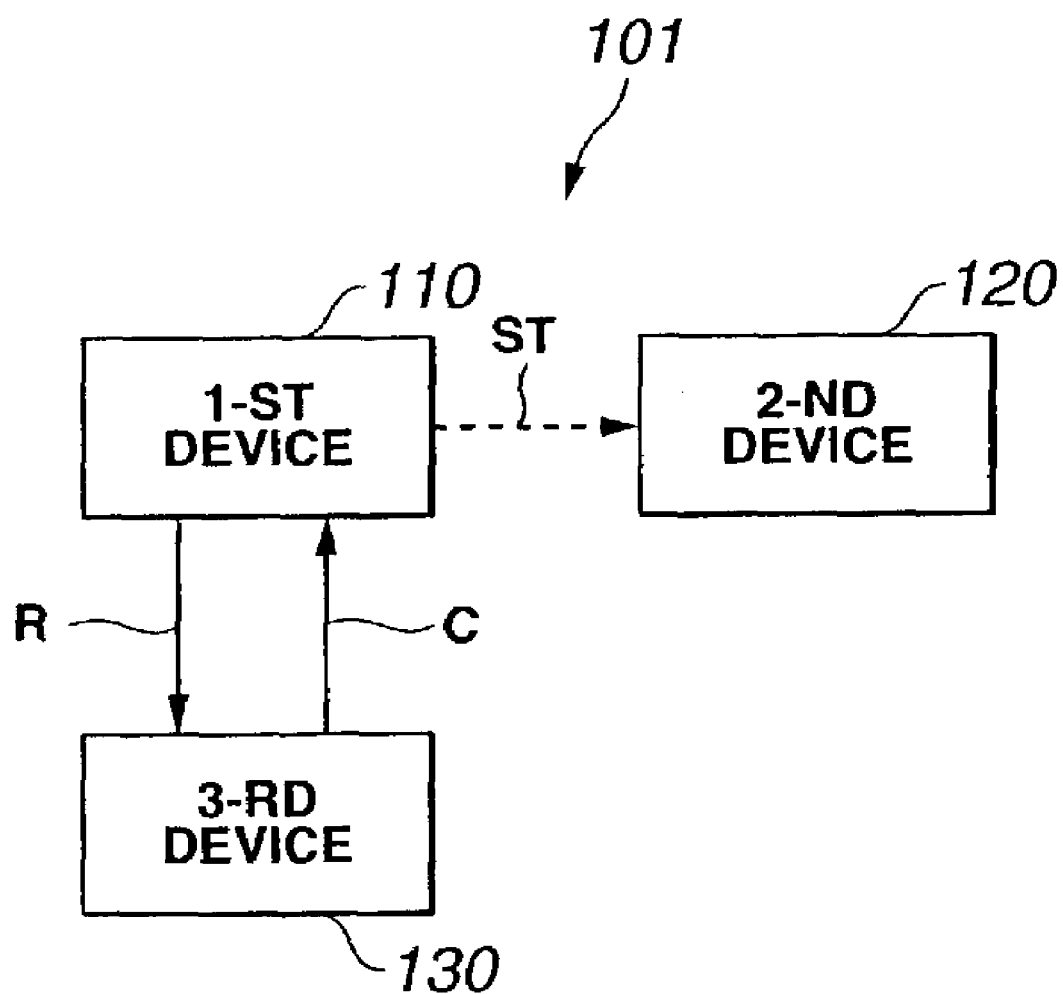
FIG. 35 is a block diagram for explaining another configuration of the data transmission system shown as another embodiment of this invention.

It is to be noted that while it has been explained in the data transmission system 50 that transmission/reception of command and response carried out between the first device 60 and the third device 80 is carried out on Bluetooth link, connection between a first device 110 and a second device 120 which carry out transmission/reception of stream ST on Bluetooth link may be also controlled by a third device 130 functioning as controller in the IEEE 1394 as in the case of a data transmission system 101 shown in FIG. 35 because command and response shown in FIGS. 31 to 33 are defined by extending AV/C. Namely, in the data transmission system 101, the first device 110 and the third device 130 are connected by serial bus in conformity with the IEEE 1394, and transmission/reception of command C and response R is carried out through this serial bus. At this time, as command C and response R, command and response shown in FIGS. 31 to 33 may be used. Of course, in this case, it is needless to say that the first device 110 is required to have both Bluetooth interface and the IEEE 1394 interface.

As explained above, in the playback system 1, correlating between Bluetooth input/output plug No. for identifying Bluetooth input/output plug serving as interface with respect to stream within the equipment and SEID for identifying stream end point serving as interface with respect to stream between equipments, thereby making it possible to obtain information of signal source of stream at the receiving side. Even in the case where plural subunits are caused to serve as signal source, information of signal source is displayed, thereby making it possible to notify that information to user. Thus, it is possible to provide high convenience for user.

In addition, in the data transmission systems 51, 101, when transmission/reception of Bluetooth stream is carried out between two equipments is carried out, it is possible to unitarily control connection between two equipments by equipment except for these two equipments. Thus, it is possible to provide high convenience for user.

It should be noted that this invention is not limited to the above-described embodiments. While explanation has been given by using player 10 with audio tuner as an equipment of the side which transmits stream, e.g., in the above-described playback system 1, this invention can be also applied to any equipment functioning as signal source, and may be applied to an equipment which transmits video stream, etc. Of course, it is not necessary that an equipment of the side which receives stream is headphone 20, and arbitrary equipment which can receive stream is conceivable.

Moreover, while it has been explained in the above-described embodiments that player 10 in the playback system 1 is an equipment having two signal sources, this invention may be applied even to an equipment having subunit serving one or plural signal sources.

Further, while it has been explained in the above-described embodiments that headphone 20 in the playback system 1 is utilized for the purpose of displaying information of obtained signal source, this invention can be applied also to the case where information of signal source is utilized for processing except for display. For example, it is possible to notify such information to user by voice.

Furthermore, while it has been described in the above-described embodiments that third devices 80, 130 in the data transmission systems 51, 101 respectively carry out transmission/reception of command and response between the third devices 80, 130 and the first devices 60, 110, this invention can be applied even to the case where the third devices 80, 130 respectively control connection through the second devices 70, 120.

In addition, while it has been described in the above-described embodiments that, as command and response used in the data transmission systems 51, 101, similarly to command and response by the fourth definition in the playback system 1, there may be used command and response obtained by extending AV/C command to define another command set, this invention may use command and response in which a method of defining command and response by the first definition or the third definition used in the playback system 1 is applied.

As stated above, it is needless to say that this invention can be suitably changed within the scope which does not depart from the gist.

INDUSTRIAL APPLICABILITY

The data transmission system according to this invention makes an inquiry with respect to the first electronic equipment about mapping of one identifier which has been grasped and the other identifier which has not been grasped on the basis of the one identifier which has been grasped by the second electronic equipment to carry out correlating between the one identifier and the other identifier to thereby have ability to obtain information of signal source of stream at the second electronic equipment to permit user to notify information of signal source. For this reason, it is possible to provide high convenience for user.

Moreover, the data transmission method according to this invention makes an inquiry with respect to the first electronic equipment about mapping of one identifier which has been grasped and the other identifier which has not been grasped on the basis of the one identifier which has been grasped by the second electronic equipment to carry out correlating between the one identifier and the other identifier to thereby have ability to obtain information of signal source of stream at the second electronic equipment to permit user to notify information of signal source. For this reason, it is possible to provide high convenience for user.

Further, the data transmission system according to this invention selects the second electronic equipment in accordance with the first electronic equipment by the third electronic equipment to instinct the first electronic equipment to connect to the second electronic equipment, thereby making it possible to unitarily control connection between two electronic equipments by the electronic equipment of the third person except for these two electronic equipments when transmission/reception of stream is carried out between two electronic equipments. Thus, it is possible to provide high convenience for user.

Further, the electronic equipment according to this invention selects the second electronic equipment in accordance with the first electronic equipment to instruct the first electronic equipment to connect to the second electronic equipment, thereby making it possible to unitarily control connection between these two electronic equipments when transmission/reception of stream is carried out between two electronic equipments. Thus, it is possible to provide high convenience for user.

Further, the data transmission system according to this invention gives an instruction so as to discover an electronic equipment in which connection can be made with respect to the first electronic equipment by the third electronic equipment, thereby making it possible to grasp an electronic equipment in which connection can be made with respect to one electronic equipment by an electronic equipment of the third person except for these two electronic equipments when transmission/reception of stream is carried out between two electronic equipments. As a result, it is possible to unitarily control connection between two electronic equipments by the electronic equipment of the third person. Thus, it is possible to provide high convenience for user.

In addition, the data transmission method according to this invention gives an instruction so as to discover an electronic equipment in which connection can be made with respect to the first electronic equipment by the third electronic equipment, thereby making it possible to grasp an electronic equipment in which connection can be made with respect to one electronic equipment by an electronic equipment of the third person except for these two electronic equipments when transmission/reception of stream is carried out between two electronic equipments. As a result, it is possible to unitarily control connection between two electronic equipments by the electronic equipment of the third person. Thus, it becomes possible to provide high convenience for user.

The electronic equipment according to this invention gives an instruction so as to discover an electronic equipment in which connection can be made with respect to the first electronic equipment, thereby making it possible to grasp an electronic equipment in which connection can be made with respect to one electronic equipment when transmission/reception of stream is carried out between two electronic equipments. As a result, it is possible to unitarily control connection between two electronic equipments. Thus, it is possible to provide high convenience for user.

The invention claimed is:

1. A data transmission system adapted for carrying out transmission/reception of a stream by one or more electronic equipments, the data transmission system comprising:
a first electronic equipment, comprising more than one signal generators, for transmitting the stream;
a second electronic equipment which is wireless-connected to the first electronic equipment and is capable of receiving the stream; and
a third electronic equipment for generating a command for selecting the second electronic equipment in accordance with the first electronic equipment, and instructing the first electronic equipment to connect to the second electronic equipment,
wherein a plurality of identifiers with respect to the stream are used in the first electronic equipment including a first identifier for identifying an interface with respect to the stream within the first electronic equipment, output from one of the signal generators, and a second identifier for identifying an interface with respect to the stream between the first electronic equipment and the second electronic equipment for receiving the stream.

2. The data transmission system as set forth in claim 1, wherein the third electronic equipment generates a command to discover one or more electronic equipment for connecting to the first electronic equipment.

3. The data transmission system as set forth in claim 2, wherein the first electronic equipment discovers devices for connection in accordance with a command from the third electronic equipment to list the devices to generate a response indicating the devices for connection, and
wherein the third electronic equipment selects the second electronic equipment from the devices for which connection can be made in accordance with the response.

4. The data transmission system as set forth in claim 1, wherein the first electronic equipment establishes a connection to the second electronic equipment which is selected by the third electronic equipment.

5. The data transmission system as set forth in claim 1, wherein the stream is an audio stream and/or a video stream.

6. The data transmission system as set forth in claim 1, wherein the first electronic equipment and the second electronic equipment are wireless-connected by a Bluetooth link.

7. The data transmission system as set forth in claim 6, wherein the first electronic equipment and the third electronic equipment are wireless-connected by a Bluetooth link.

8. The data transmission system as set forth in claim 6, wherein the first electronic equipment and the third electronic equipment are connected by a serial bus in conformity with the IEEE 1394.

9. The data transmission method as set forth in claim 6, wherein the first electronic equipment and the third electronic equipment are connected by a serial bus in conformity with the IEEE 1394.

10. A data transmission method of carrying out transmission/reception of a stream by a plurality of electronic equipments,
the data transmission method comprising:
a command generation step of generating a command for selecting, by a third electronic equipment, a second electronic equipment which is wireless-connected to a first electronic equipment for transmitting the stream and is capable of receiving the stream in accordance with the first electronic equipment to instruct the first electronic equipment to connect to the second electronic equipment,
wherein the first electronic equipment comprises more than one signal generators,
wherein a plurality of identifiers with respect to the stream are used in the first electronic equipment including a first identifier for identifying an interface with respect to the stream within the first electronic equipment, output from one of the signal generators, and a second identifier for identifying an interface with respect to the stream between the first electronic equipment and the second electronic equipment for receiving the stream.

11. The data transmission method as set forth in claim 10, further comprising:
a second command generation step of generating a command to discover one or more electronic equipment for connection to the first electronic equipment.

12. The data transmission method as set forth in claim 11, further comprising:
a response generation step of discovering devices in which a connection can be made in accordance with a command from the third electronic equipment generated at the second command generation step by the first electronic equipment to list the devices to generate a response indicating the devices for connection,
wherein, at the command generation step, the second electronic equipment is selected from the devices for connection in accordance with the response by the third electronic equipment.

13. The data transmission method as set forth in claim 10, further comprising:
a connection establishment step of establishing a connection with respect to the second electronic equipment selected by the third electronic equipment at the command generation step by the first electronic equipment.

14. The data transmission method as set forth in claim 10, wherein the stream is an audio stream and/or a video stream.

15. The data transmission method as set forth in claim 10, wherein the first electronic equipment and the second electronic equipment are wireless-connected by a Bluetooth link.

16. The data transmission method as set forth in claim 15, wherein the first electronic equipment and the third electronic equipment are wireless-connected by a Bluetooth link.

17. A data transmission system adapted for carrying out transmission/reception of a stream by a plurality of electronic equipments, the data transmission system comprising:
a first electronic equipment for transmitting the stream;
a second electronic equipment which is wireless-connected to the first electronic equipment and is capable of receiving the stream; and
a third electronic equipment for generating a command to discover an electronic equipment or equipments in which connection can be made with respect to the first electronic equipment,
wherein the first electronic equipment comprises more than one signal generators,
wherein a plurality of identifiers with respect to the stream are used in the first electronic equipment including a first identifier for identifying an interface with respect to the stream within the first electronic equipment, output from one of the signal generators, and a second identifier for identifying an interface with respect to the stream between the first electronic equipment and the second electronic equipment for receiving the stream.

18. A data transmission method of carrying out transmission/reception of a stream by a plurality of electronic equipments, the data transmission method comprising:

a command generation step of generating a command for discovering an electronic equipment or equipments in which a connection can be made with respect to a first electronic equipment for transmitting the stream by a third electronic equipment, different from the first electronic equipment and a second electronic equipment, which is wireless-connected to the first electronic equipment and is capable of receiving the stream, wherein the first electronic equipment comprises more than one signal generators, wherein a plurality of identifiers with respect to the stream are used in the first electronic equipment including a first identifier for identifying an interface with respect to the stream within the first electronic equipment, output from one of the signal generators, and a second identifier for identifying an interface with respect to the stream between the first electronic equipment and the second electronic equipment for receiving the stream.

19. An electronic equipment constituting a data transmission system for carrying out transmission/reception of a stream by a plurality of electronic equipments, wherein a first electronic equipment for transmitting the stream and a second electronic equipment, which is wireless-connected to the first electronic equipment and is capable of receiving the stream, are different from each other, the first electronic equipment comprising:

more than one signal generators, command generating means for generating a command for discovering an electronic equipment or equipments in which a connection can be made with respect to the first electronic equipment, and response analysing means for analysing a response, indicating information of the electronic equipment or equipments, transmitted from the first electronic equipment, wherein a plurality of identifiers with respect to the stream are used in the first electronic equipment including a first identifier for identifying an interface with respect to the stream within the first electronic equipment, output from one of the signal generators, and a second identifier for identifying an interface with respect to the stream between the first electronic equipment and the second electronic equipment for receiving the stream.

* * * * *